US 9,489,039 B2

United States Patent
Donovan et al.

(10) Patent No.: US 9,489,039 B2
(45) Date of Patent: *Nov. 8, 2016

(54) SYSTEMS AND METHODS FOR PRESENTING INTERMEDIARIES

(75) Inventors: John Donovan, Dallas, TX (US); James Carlton Bedingfield, Sr., Gainesville, GA (US); Barbara Roden, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 1057 days.

This patent is subject to a terminal disclaimer.

(21) Appl. No.: 12/412,725

(22) Filed: Mar. 27, 2009

(65) Prior Publication Data

US 2010/0251147 A1 Sep. 30, 2010

(51) Int. Cl.
| | |
|---|---|
| G06F 3/048 | (2013.01) |
| G06F 3/01 | (2006.01) |
| H04N 7/173 | (2011.01) |
| H04N 21/422 | (2011.01) |
| H04N 21/4223 | (2011.01) |
| H04N 21/431 | (2011.01) |
| H04N 21/472 | (2011.01) |
| H04N 21/475 | (2011.01) |
| H04N 21/61 | (2011.01) |

(52) U.S. Cl.
CPC ............ *G06F 3/011* (2013.01); *H04N 7/173* (2013.01); *H04N 21/4223* (2013.01); *H04N 21/42201* (2013.01); *H04N 21/4312* (2013.01); *H04N 21/4314* (2013.01); *H04N 21/4751* (2013.01); *H04N 21/47205* (2013.01); *H04N 21/6187* (2013.01); *G06F 2203/011* (2013.01)

(58) Field of Classification Search
USPC .......................................... 715/753, 757, 758
See application file for complete search history.

(56) References Cited

U.S. PATENT DOCUMENTS

| | | | |
|---|---|---|---|
| 6,757,722 B2 | 6/2004 | Lonnfors et al. | |
| 6,791,583 B2 | 9/2004 | Tang et al. | |
| 7,206,388 B2 | 4/2007 | Diacakis | |
| 7,386,799 B1 * | 6/2008 | Clanton et al. | 715/758 |
| 7,769,806 B2 * | 8/2010 | Wie et al. | 709/203 |
| 7,818,005 B2 | 10/2010 | Caspi | |

(Continued)

OTHER PUBLICATIONS

Microsoft Corporation, "Discover Windows Messenger", pp. 1-3, http://www.microsoft.com/windowsxp/using/windowsmessenger/getstarted/discover.mspx. Web site last visited Mar. 10, 2009.

(Continued)

*Primary Examiner* — Dino Kujundzic
(74) *Attorney, Agent, or Firm* — Guntin & Gust, PLC; Atanu Das

(57) ABSTRACT

A system that incorporates teachings of the present disclosure may include, for example, an intermediary engine having a controller, and a storage medium for storing instructions to be executed by the controller. The instructions, when executed by the controller, can cause the controller to receive a measure of a mood of an individual, invoke an intermediary according to the measure of the mood of the individual, and present the intermediary to an entity requesting to interact with the individual. The measure of the mood can be synthesized from collected information associated with a behavior of the individual, and can have a plurality of dimensions. The mood can also indicate an availability of the individual and a receptiveness of the individual to accept a request to interact with an entity. Other embodiments are disclosed.

29 Claims, 19 Drawing Sheets

(56) References Cited

U.S. PATENT DOCUMENTS

| | | |
|---|---|---|
| 7,908,554 B1 | 3/2011 | Blattner |
| 7,920,847 B2 | 4/2011 | Jennings et al. |
| 7,921,369 B2 | 4/2011 | Bill |
| 2002/0054072 A1* | 5/2002 | Hayes-Roth ............... 345/727 |
| 2002/0109719 A1* | 8/2002 | Hata et al. ............... 345/748 |
| 2002/0111813 A1 | 8/2002 | Capps |
| 2002/0158873 A1* | 10/2002 | Williamson ............... 345/427 |
| 2003/0229900 A1* | 12/2003 | Reisman ............... 725/87 |
| 2004/0037396 A1 | 2/2004 | Gray et al. |
| 2004/0128350 A1* | 7/2004 | Topfl et al. ............... 345/757 |
| 2005/0010637 A1 | 1/2005 | Dempski et al. |
| 2005/0210104 A1 | 9/2005 | Torvinen |
| 2005/0289470 A1 | 12/2005 | Pabla |
| 2006/0170945 A1* | 8/2006 | Bill ............... 358/1.13 |
| 2007/0260984 A1* | 11/2007 | Marks et al. ............... 715/706 |
| 2008/0005294 A1 | 1/2008 | Morris |
| 2008/0082613 A1* | 4/2008 | Szeto et al. ............... 709/206 |
| 2008/0201638 A1* | 8/2008 | Nair ............... 715/706 |
| 2008/0294741 A1* | 11/2008 | Dos Santos et al. ......... 709/206 |
| 2009/0013048 A1* | 1/2009 | Partaker et al. ............... 709/206 |
| 2009/0055484 A1 | 2/2009 | Vuong |
| 2009/0063992 A1* | 3/2009 | Gandhi et al. ............... 715/752 |
| 2009/0309891 A1 | 12/2009 | Karkanias |
| 2010/0070987 A1 | 3/2010 | Amento et al. |
| 2010/0115426 A1 | 5/2010 | Liu |
| 2010/0145890 A1 | 6/2010 | Donovan |
| 2010/0205541 A1* | 8/2010 | Rapaport et al. ............. 715/753 |
| 2010/0299615 A1 | 11/2010 | Miluzzo |
| 2011/0007142 A1* | 1/2011 | Perez et al. ............... 348/77 |

OTHER PUBLICATIONS

Dictionary.com, "Definition of Metaphor", The American Heritage® New Dictionary of Cultural Literacy, Third Edition. Houghton, Mifflin Company, 2005. http://dictionary.reference.com/browse/metaphor (accessed: Dec. 4, 2007), downloaded Apr. 16, 2012.

Merriam Webster, "Definition of Metaphor", Apr. 30 2007 downloaded Apr. 16, 2012, http://web.archive.org/web/20070430193601/http://www.merriam-webster.com/dictionary/metaphor Patent Cooperation Treaty, "International Search Report and Written Opinion", Isaius, by Officer Lee W. Young in PCT Application No. PCT/US09/66012; Document of 11 pages dated Jul. 26, 2010.

* cited by examiner

US 9,489,039 B2

SYSTEMS AND METHODS FOR PRESENTING INTERMEDIARIES

FIELD OF THE DISCLOSURE

The present disclosure relates generally to communication techniques and more specifically to systems and methods for presenting intermediaries.

BACKGROUND

Instant messaging applications such as Microsoft's Windows Messenger™ can provide users a way to track the availability of others to communicate. Windows Messenger™ can for example indicate that a targeted party is online, away from his/her computer, or offline. Presence and location systems can be used in similar applications to provide the whereabouts of an individual, the availability of the individual to communicate, an indication of the state of use of a communication device of the individual, and so on.

DETAILED DESCRIPTION

An embodiment of the present disclosure can entail an intermediary engine having a controller, and a storage medium for storing instructions to be executed by the controller. The instructions, when executed by the controller, can cause the controller to receive a measure of a mood of an individual, invoke an intermediary according to the measure of the mood of the individual, and present the intermediary to an entity requesting to interact with the individual. The measure of the mood can be synthesized from collected information associated with a behavior of the individual, and can have a plurality of dimensions. The mood can also indicate an availability of the individual and a receptiveness of the individual to accept a request to interact with an entity.

An embodiment of the present disclosure can entail a computer-readable storage medium having computer instructions to receive a measure of a mood of an individual to interact with an entity, and invoke an intermediary according to the measure of the mood of the individual.

An embodiment of the present disclosure can entail an avatar engine having a controller, and a storage medium for storing instructions to be executed by the controller. The instructions, when executed by the controller, can cause the controller to identify an avatar according to a measure of a mood of an individual to interact with an entity.

An embodiment of the present disclosure can entail invoking an intermediary to interact with an entity responsive to receiving a measure of a mood of an individual to interact with the entity.

Figure 1:
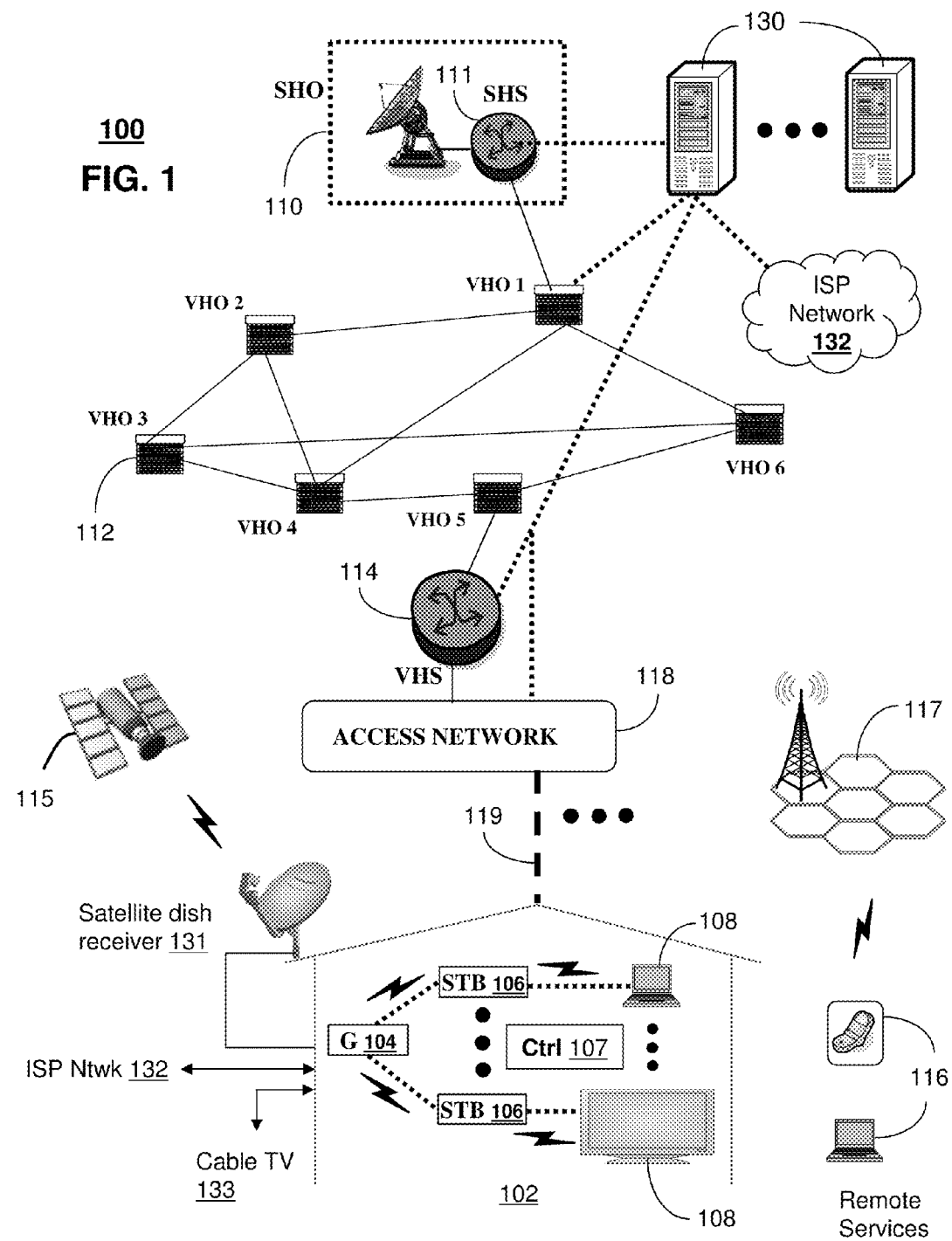
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, a common analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive media content services.

Figure 2:
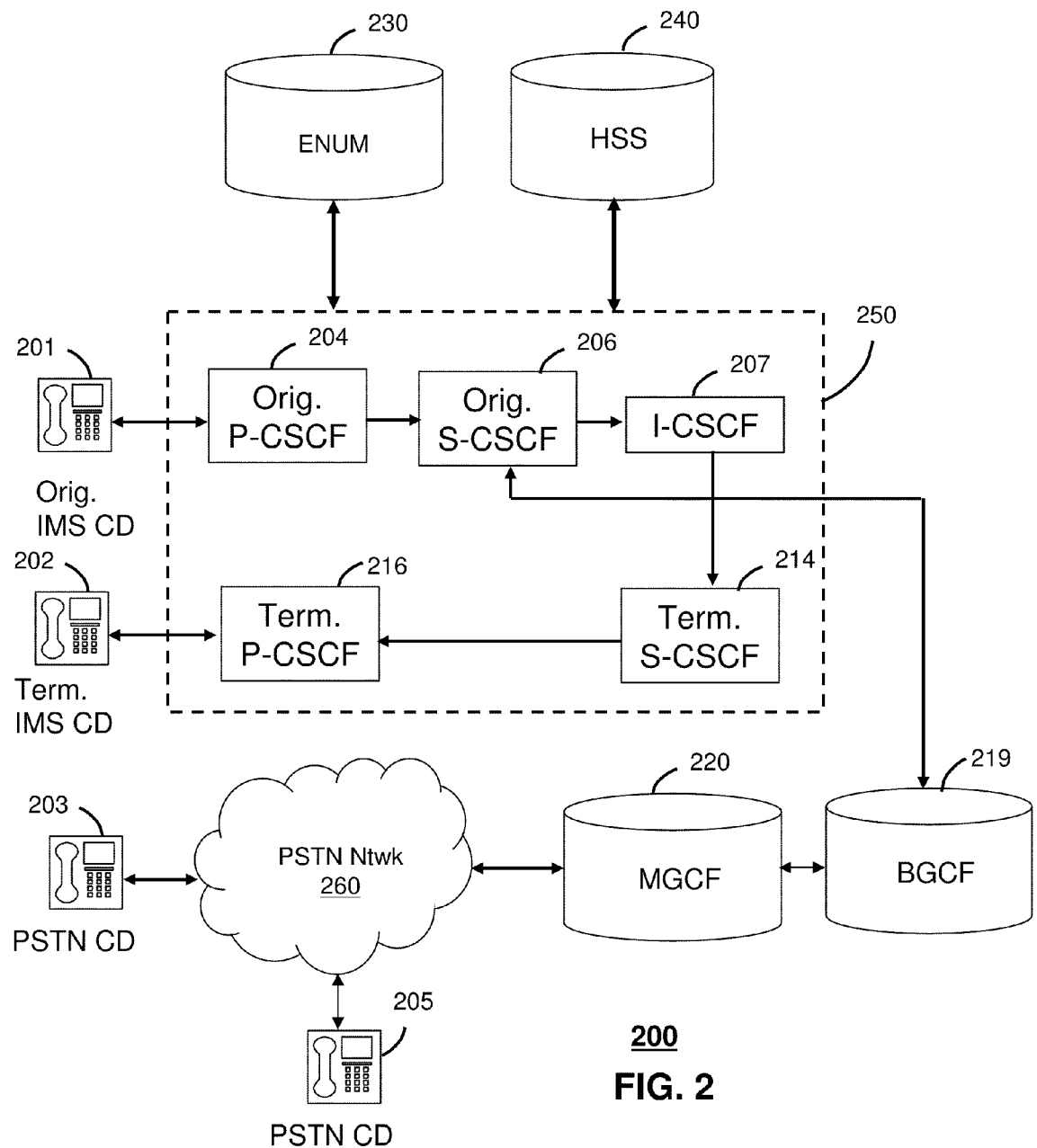

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a E.164 NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM server 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as CD 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as CDs 203 or 205, the ENUM server 230 can respond with an unsuccessful address resolution which can cause the originating S-CSCF 206 to forward the communication request to the MGCF 220 via a Breakout Gateway Control Function (BGCF) 219. The MGCF 220 can then initiate communications with the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
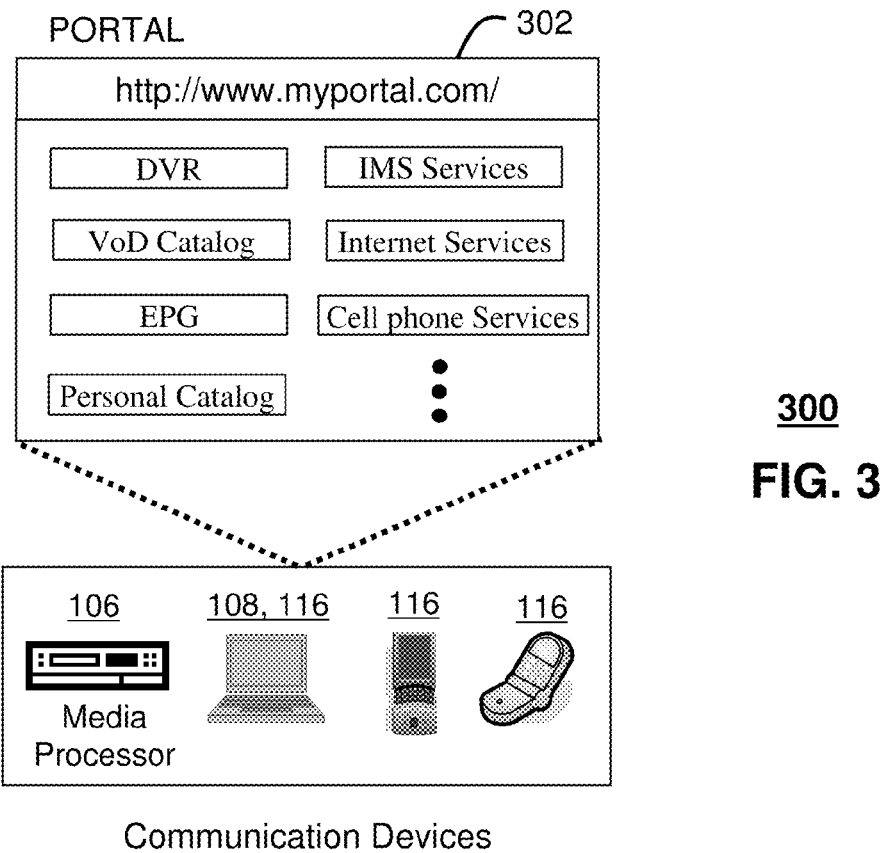
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100, 200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access the media processor 106 and services managed thereby such as a Digital Video Recorder (DVR), a VoD catalog, an EPG, a personal catalog (such as personal videos, pictures, audio recordings, etc.) stored in the media processor 106, provisioning IMS services described earlier, provisioning Internet services, provisioning cellular phone services, and so on.

Figure 4:
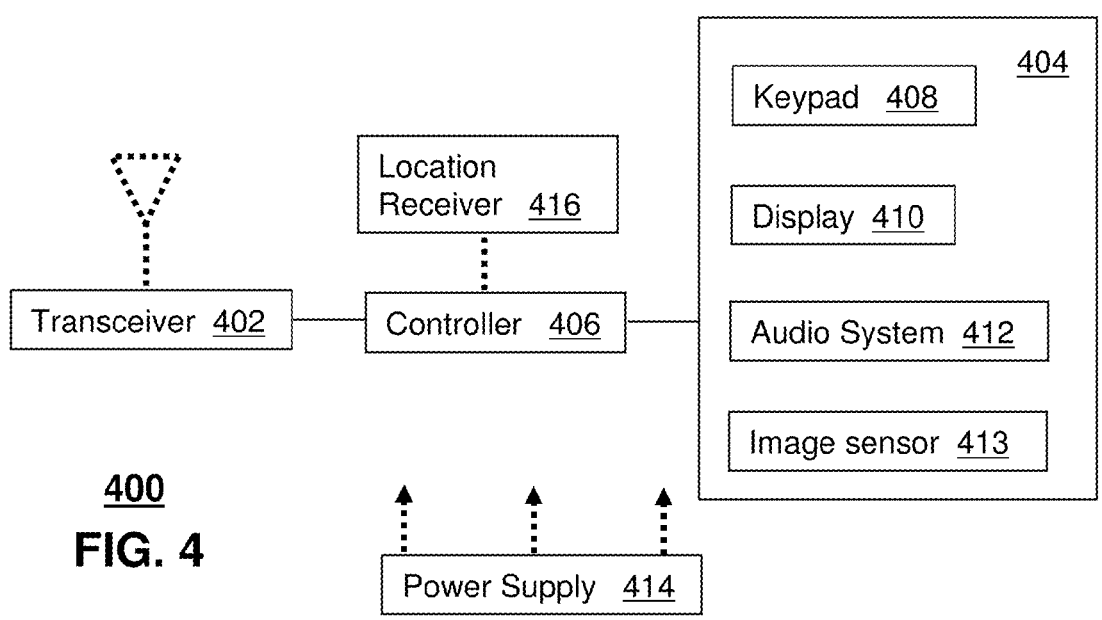
FIG. 4 depicts an illustrative embodiment of a communication device utilized in the communication systems of FIGS. 1-2.

FIG. 4 depicts an exemplary embodiment of a communication device 400. Communication 400 can serve in whole or in part as an illustrative embodiment of the communication devices 106, 108, 116, 201, 202, 203, and 205 of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The UI 404 can further include an image sensor 413 such as a charged coupled device (CCD) camera for capturing or transmitting still or moving images.

The power supply 414 can utilize common power management technologies such as replaceable and rechargeable batteries, supply regulation technologies, and charging systems technologies for supplying energy to the components of the communication device 400 to facilitate long-range or short-range portable applications. The location receiver 416 can utilize common location technology such as a global positioning system (GPS) receiver for identifying a location of the communication device 100 based on signals generated by a constellation of GPS satellites, thereby facilitating common location services such as navigation. The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
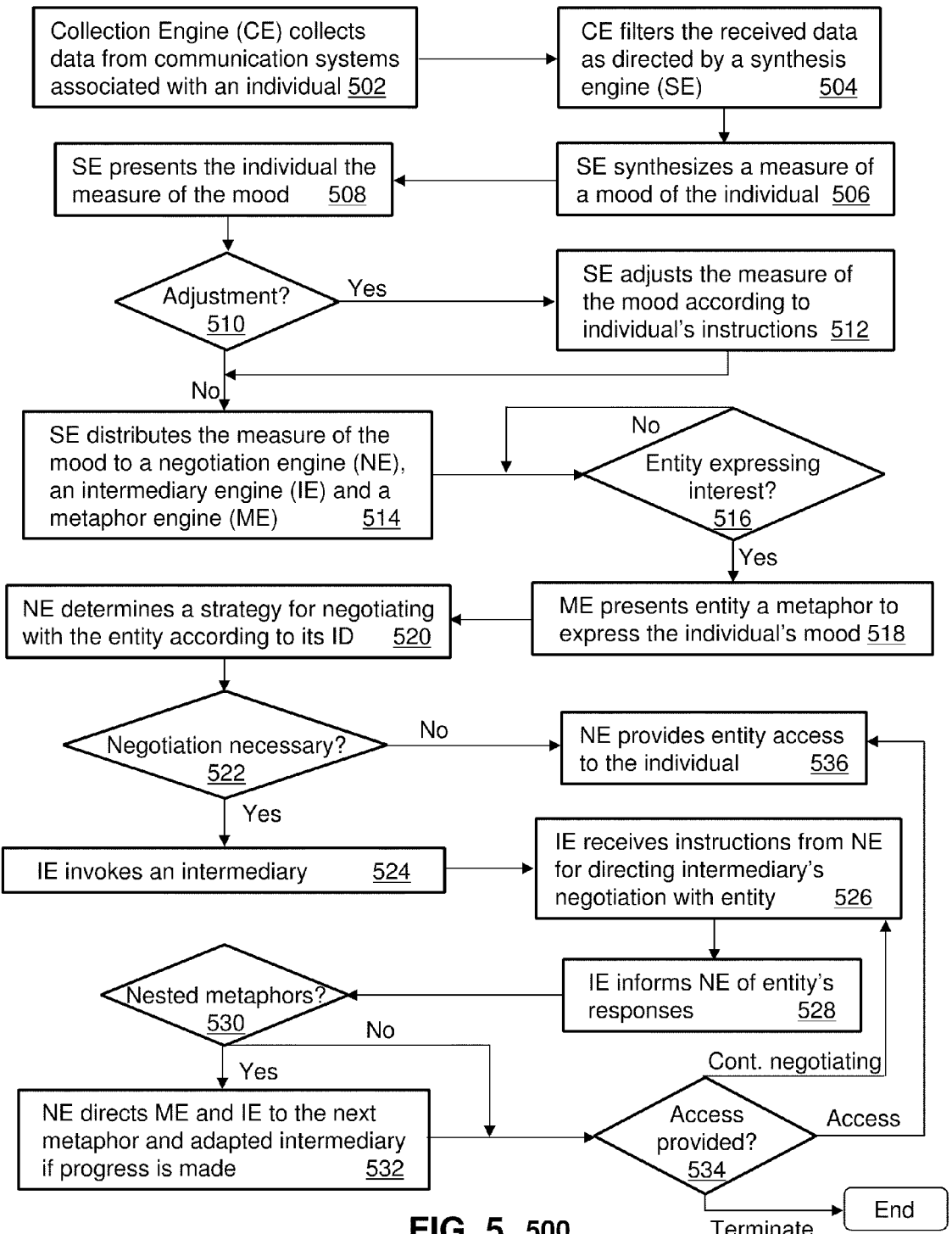
FIGS. 5-6 depict illustrative embodiments of methods according to the present disclosure.
Figure 7:
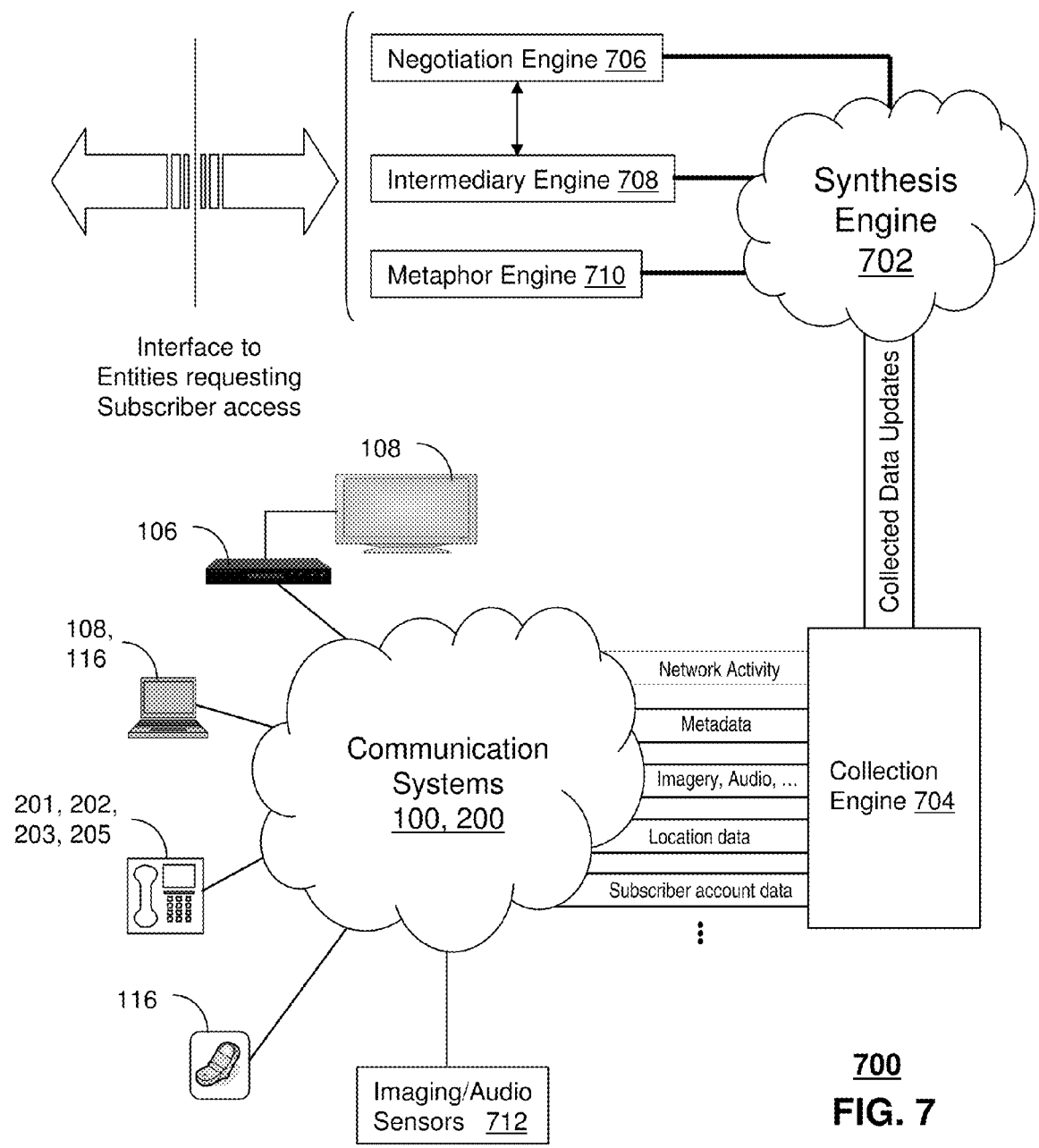
FIG. 7 depicts an illustrative embodiment of a system for managing access to individuals according to the methods of FIGS. 5-6.

FIG. 5 depicts an illustrative method 500 that can be applied to a system 700 shown in FIG. 7 that can be overlaid or operably coupled to communication systems 100 and 200 of FIGS. 1-2 as another representative embodiment of these communication systems. System 700 can comprise a synthesis engine 702, a collection engine 704, a negotiation engine 706, an intermediary engine 708, and a metaphor engine 710, each of which can operate from common computing and communication resources such as, for example, a server, mainframe or other suitable computing device with a capability to communicate over an IP, PSTN, or a wireless interface such as those described above. System 700 can be used to manage interactions between an individual and entities expressing an interest in interacting with the individual.

Method 500 can begin with step 502 in which the collection engine 704 collects from communication systems 100 and 200 data associated with an individual whose communications and actions are being monitored for the purpose of providing interaction management services such as those described by the present disclosure. To accomplish this step the collection engine 704 can interface to a plurality of network elements such as routers, switches, DSLAMs, billing systems, provisioning systems, or other common network elements of the communication systems 100 and 200. The information collected from these network elements can represent, for example, network activity data, metadata, imagery and audio data, location data, and subscriber account data, each having some association with the individual.

Network activity data can represent communication traffic originating from the individual's use of resources of the communication systems 100 or 200. For example, network activity can arise from the individual's use of the ISP network 132 of FIG. 1 (sending emails, browsing the Internet, engaging in instant messaging, etc.). Network activity can also arise from the individual engaging in voice or data communications over the IMS network 250 or a cellular system such as reference 117, or by the individual's viewing of a movie supplied by a VoD service of the IPTV media system of FIG. 1. Other sources of network activity that can be derived from communication systems 100-200 are contemplated by the present disclosure.

The metadata can be collected by the collection engine 704 from an EPG system of the communication system 100. The metadata can be used to describe media content consumed by the individual (e.g., movie genre, movie title, and so on). Imagery and/or audio data can also be collected by the collection engine 704 from, for example, web cameras located in a home (kitchen, family room, game room, etc.) or business establishment (office, reception area) of the individual. The imagery collected can be still images, video content, or a combination thereof.

The audio data can also be collected from communication devices of the individual (computer, desktop phone, cell phone, etc.) which can be selectively enabled by the collection engine 704 to provide audio-only data by way of a microphone integrated in the communication devices. Microphones can also be integrated with the web cameras or can be individually located in a number of locations of the individual's home and/or business to provide audio data to the collection engine 704. The image and/or audio data can be used to describe the environment and activities of the individual. The image and/or audio data can be supplied to the collection engine 704 by the abovementioned devices which can be represented collectively as image/audio sensors 712 of FIG. 7.

The collection engine 704 can also collect location data associated with the individual which can be represented by coordinate information (longitude, latitude) supplied by communication devices 116 of the individual with a GPS receiver or from triangulation analysis performed on communication data supplied by network elements of communication systems 100 and 200. Other location data collection methods such as detecting a proximity of communication devices to known WiFi antennae are contemplated by the present disclosure. The collection engine 704 can also receive subscriber account data from billing or provisioning systems operating in the communication systems 100 and 200. The subscriber account data can indicate which services an individual is subscribed to, how much the services are costing the individual, where the individual lives, how many parties are located in the household of the individual, and the individual's payment or credit history.

Given the extensive communications and processing resources of communication systems 100 and 200, it would be apparent to an artisan with ordinary skill in the art that other sources of information associated with the individual can be collected by the collection engine 704. For instance, the communication systems 100 and 200 can provide telemetry data to the collection engine 704. The telemetry data can indicate how often the individual utilizes any one of the above media resources (IPTV media system, cable TV, satellite TV, cellular telephony, PSTN telephony, IMS telephony, Internet resources, and so on). The telemetry information can also indicate which communication devices of the user are powered down, which are powered up, as well as other states of usage of these devices.

The collection engine 704 can receive directives from the synthesis engine 702 to determine which information is to be collected about the individual, how it is to be filtered (if at all) in step 504, and when and in what format the collected information is to be distributed to the synthesis engine 702. To avoid overburdening the synthesis engine 702, the collection engine 704 can be directed by the synthesis engine 702 to identify incremental changes in the collected information and only transmit these changes to the synthesis engine 702. The incremental changes can be supplied to the synthesis engine 702 as collected data updates as shown in FIG. 7. The synthesis engine 702 can also apply degrees of importance (such as weighting factors) to aspects of the collected information described above to manage the extent and priority given to the collected data processed by the synthesis engine 702.

In step 506, the synthesis engine 702 can synthesize a measure of a mood of the individual from the collected data updates provided by the collection engine 704. The measure of the mood can for example indicate an availability and receptiveness of the individual to interact with another entity. In the present context the term entity can mean a human being (such as friends or family of the individual) or an artificial intelligence system such as a gaming system, social networking system, or other system requesting an interaction with the individual. To synthesize the measure of the mood of the individual, the synthesis engine 702 can be programmed to determine from the collected data updates a context of activity of the individual, a location of the individual, a state of usage of the communication devices or computing devices of the individual, and a behavioral profile of the individual.

The context of activity of the individual can be determined in several ways. For example, aspects of the collected network activity can indicate to the synthesis engine 702 that the individual is watching a television program at home, is working at his/her computer in the office, is neither at home or in the office, or is on a business trip. Lack of network activity can indicate a state of rest for the individual. The metadata collected from media content consumed by the individual can also be used to identify what the individual is watching on television (VoD movie, documentary, football game, etc.). The location data can indicate that the user is at home, in the office, driving in an automobile, traveling on a train, sitting at a restaurant or a movie theater, etc.

Collectively, the above information can be used by the synthesis engine 702 to determine a context of activity of the individual. The synthesis engine 702 can, for example, categorize the individual's activity as an entertainment context, an occupational context, or a privacy context. An entertainment content can arise when the individual is at home watching a football game with friends and family. An occupational context can arise, for example, when the individual is at the office, and is engaged in a conference call. A privacy context can arise when the individual is resting in bed or has proactively submitted a request to system 700 for a quiet moment. Other possible forms of contextual identification are contemplated by the present disclosure.

The synthesis engine 702 can also historically track the context of activity of the individual, the location of the individual, and the state of usage of communication and computing devices of the individual. Utilizing common statistical pattern recognition tools, the synthesis engine 702 can detect historical patterns that can indicate the habits and customs of the individual. The synthesis engine 702 can for example determine that upon arriving at home from a typical work day, the individual turns on the TV to the ESPN channel. The synthesis engine 702 can also identify from metadata that the individual is particularly interested in certain sports teams. Behavioral information such as this can be saved by the synthesis engine 702 in a behavioral profile.

The behavioral profile of the individual can describe the habits and customs of the individual during a work week and on weekends. The customs and habits recorded in the profile can include for example who the individual commonly communicates with, an identification of common media content consumed by the individual, which communication and computing devices the individual uses at different times of the day, likes and dislikes of the individual, and so forth. The behavior profile can be comprehensive in its descriptions of the individual. For example, the individual's behavior on a particular day can be described in time intervals: a first interval starting from the time the individual wakes up, a second interval starting from the time the individual arrives at his/her office, a third interval starting from the time the individual returns home from work, and a fourth interval starting at the time the individual goes to sleep. Each of these intervals can be described in temporal units (every half hour, every hour, etc.).

The behavioral profile of the individual can also be refined with subscriber account data. The subscriber account data of the individual combined with a knowledge of the media consumption behavior of the individual can provide the synthesis engine 702 sufficient information to demographically and psychographically profile the individual. The behavioral profile can therefore identify demographic aspects of the individual such as age group, gender, income level and education, and psychographic aspects such as traits of the individual, likes and dislikes of the individual, attitudes of the individual, interests of the individual, and lifestyle of the individual.

Figure 8:
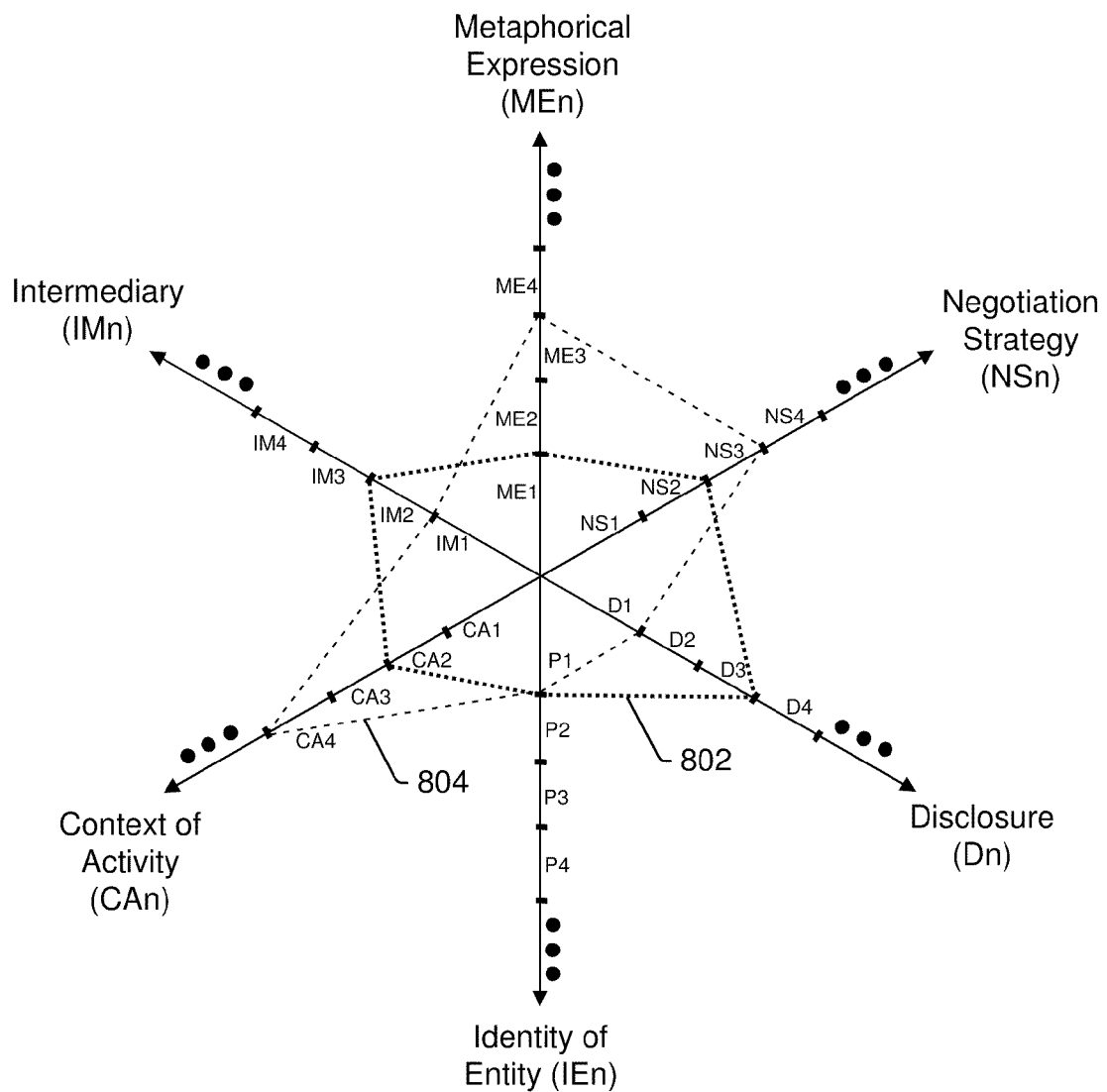
FIG. 8 depicts an illustrative embodiment of a multidimensional representation of an individual's mood according to the methods of FIGS. 5-6.

The synthesis engine 702 can determine the measure of the mood of the individual singly or in combination from the context of activity of the individual, the location of individual, the state of usage of communication and computing devices of the individual, and the behavioral profile of the individual. The resulting measure can be described in a plurality of dimensions. FIG. 8 depicts an illustrative embodiment of the plurality of dimensions associated with the measure of the mood of the individual. Other embodiments of the illustration of FIG. 8 are contemplated by the present disclosure.

The illustration in FIG. 8 is a planar representation of six possible dimensions for describing the mood of the individual: (1) a first dimension to manage a metaphorical expression of the mood of the individual to interact with an entity (MEn), (2) a second dimension to manage a disclosure to the entity of one or more activities of the individual (Dn), (3) a third dimension to manage a negotiation with the entity to provide the entity a degree of access to the individual (NSn), (4) a fourth dimension to manage an intermediary that conducts the negotiation with the entity (IMn), (5) a fifth dimension to manage the first through fourth dimensions according to an identity of the entity requesting to interact with the individual (IEn), and (6) a sixth dimension to manage the first through fourth dimensions according to a context of activity of the individual at the time the entity requests an interaction with the individual (CAn).

For illustration purposes only, the entity will be referred to herein as a party expressing an interest to interact with the individual. It is understood however that the party can be replaced with an artificial intelligence system without affecting the scope of the disclosure that follows.

The first dimension can be subdivided into elements, each identifying a plurality of metaphor expressions (ME1 through MEn) which can be used to express the mood of the individual to interact with a party. The elements of the second dimension can identify a plurality of techniques to disclose the activities of the individual (D1 through Dn) to the party. The elements of the third dimension can identify a plurality of negotiation strategies (NS1 through NSn) to provide the party a degree of access to the individual. The elements of the fourth dimension can identify a plurality of intermediaries (IM1 through IMn) that can be called on to negotiate with the party the degree of access to the individual. The elements of the fifth and sixth dimensions can identify a plurality of parties (P1 through Pn) and context of activities of the individual (CA1 through CAn) which the synthesis engine 702 can use to create a plurality of multi-dimensional scenarios depicted illustratively by references 802 and 804. These scenarios can be used by the negotiation engine 706, the intermediary engine 708, and the metaphor engine 710 to perform their respective functions.

For illustration purposes, suppose that party P1 corresponds to Sam Doe (a friend of the individual). The scenario of reference 802 shows that when the context of activity of the individual is CA2 and the requesting party is Sam Doe (P1), the intermediary engine 708 is directed by the synthesis engine 702 to select the intermediary IM2, the metaphor engine 710 is to directed to select the metaphor expression ME1, the negotiation engine 706 is to directed to select the negotiation strategy NS2, and the metaphor engine 710 is directed to select a disclosure technique D3.

The context of activity CA2 can represent an occupational context of the individual such as when the individual is busy at work, on the phone, or drafting documents on his/her computer. Intermediary IM2 can represent the selection of an interactive avatar presented to the party prior to providing communication access to the individual. The metaphor expression ME1 can represent a metaphor expression such as a partially opened door to indicate the availability and receptiveness of the individual to interact with the party.

The disclosure D3 can identify an actual metaphor or synthesized metaphor that reveals in whole or in part the activities of the individual. An actual metaphor can be represented by a visual or audible presentation of the activities of the individual supplied by data from a web camera and/or audio sensor 712 collected by the collection engine 704 which can be transmitted to the metaphor engine 710. A synthesized metaphor of the individual's activities on the other hand can be represented by a virtual depiction of the individual's activities which can be presented to the party in a visual and/or audible format (e.g., a picture of an animated figure working from an office with a partially opened door, or the sound of a door opening partially with keyboard strokes heard in the background).

The negotiation strategy NS2 can define a negotiation interaction with the party. The negotiation interaction can be described by flowcharts generated by the synthesis engine 702 which outline queries directed to the party and actions to be taken by the negotiation engine 706 according to the party's responses to the queries. Negotiation interactions can also be described by artificial intelligence algorithms capable of addressing complex communication exchanges with the party which can address open-ended discussions that are not as straightforward as a static flowchart.

Reference 804 illustrates another scenario identified by the synthesis engine 702 when the context of activity of the individual changes from CA2 to CA4 for the same party (Sam Doe). The transition from reference 802 to 804, results in a change of the intermediary from IM2 to IM1, a change of the metaphor expression from ME1 to ME3, a change of the negotiation strategy from NS2 to NS3, and a change of the disclosure technique from D3 to D1. Many other scenarios (which are not shown) can be generated by the synthesis engine 702 for the multidimensional chart of FIG. 8. Each of these scenarios can be communicated in whole or in part to the negotiation engine 706, the intermediary engine 708 and the metaphor engine 710 as a multidimensional description of the mood of the individual at any particular time and day of the week. The synthesis engine 710 can also communicate more than once a day updates in the multidimensional description of the mood of the individual to the negotiation engine 706, the intermediary engine 708 and the metaphor engine 710.

Once a measure of the mood of the individual has been determined in step 506, the synthesis engine 702 can present in step 508 the results to the individual on a communication device of the individual such as his/her computer. The presentation can be a graphical representation 800 such as shown in FIG. 8. To manage the presentation, the synthesis engine 702 can be directed by the individual to present one scenario at a time on a per party basis. When there are too many scenarios to review, the individual can focus his/her attention on a few parties of interest (such as family, management, executive staff). During the presentation of a particular scenario, the individual can qualitatively adjust each scenario by selecting a portion of a reference line with a navigation device such as a mouse, and moving it between elements for any of the dimensions shown in FIG. 8.

For example, in the case of reference 802, the individual can move the line intersection from intermediary IM2 to intermediary IM3, and disclosure D3 to disclosure D1, while retaining the previous intersections at the metaphorical expression ME1 and negotiation strategy NS2. Alternatively, the individual can submit quantitative changes to the displayed scenario by way of a keyboard entry ("Change IM2 to IM3, and D3 to D1").

It will be appreciated by an artisan with ordinary skill in the art that other methods can be used by the individual for qualitatively or quantitatively updating the scenarios presented by the synthesis engine 702. For instance, the synthesis engine 702 can use common graphical tools such as "sliders" or "knobs" to provide the individual a means to make updates. Each dimension shown in FIG. 8 can be presented with a corresponding slider or knob that the individual can use to change between elements of a proposed scenario.

The individual can also be presented with an additional slider or knob that represents a collective measure of multiple dimensions. The slider or knob in this instance can signify discrete levels or a continuous range of a receptiveness of the individual to interact with others or with a particular party. Moving the slider to the left or turning the knob counterclockwise can represent a decrease in the receptiveness of the individual to interact, while moving the slider to the right or the knob clockwise can represent an increase in the receptiveness to interact. The synthesis engine 702 can present the slider or knob in a position that corresponds to the scenario originally determined by the synthesis engine 710. A departure from this position can change the intersections shown in FIG. 8 for a particular scenario (or multiple scenarios). The synthesis engine 702 can graphically show the adaptation of a scenario (or scenarios) as the individual moves the slider or knob.

In addition to the chart of FIG. 8, the synthesis engine 702 can also provide statistical data for each scenario as well as for a collection of scenarios. The statistical data can be presented graphically such as by way of a probability distribution (Gaussian, Poisson) with standard deviation, variance, and confidence metrics. For individuals who have less technical expertise, the synthesis engine 702 can apply color coding techniques to a statistical graph to indicate mood interpretations of the individual. For example, the color green can represent a receptive mood of the individual to interact with others while red represents an unreceptive mood. The colors can be defined by a legend. Sliders and knobs can be presented with these representations so that the individual can also adjust statistical predictions of the mood of the individual on a scenario basis, or across a collection of scenarios.

The qualitative or quantitative changes made by the individual as described above to the measure of the mood of the individual can be detected by the synthesis engine 702 in step 510 and updated in step 512.

In step 514, the synthesis engine 702 can distribute in whole or in part the updated multidimensional measure of the mood of the individual to the negotiation engine 706, the intermediary engine 708 and the metaphor engine 710. The multidimensional measure can be distributed as digital codes each representing scenarios synthesized by the synthesis engine 702. In step 516, the negotiation engine 706 and the metaphor engine 710 can monitor parties expressing an interest in interacting with the individual.

Step 516 can be accomplished by the negotiation engine 706 and/or the metaphor engine 710 detecting communication origination signals initiated by communication or computing devices of a party (such as the media processor 106 or CDs 108, 116, 201, or 203), each of these devices of the party communicatively coupled to communication systems 100 and 200. A communication original signal can arise from a PSTN call causing the generation of SS7 signaling information, a VoIP call causing the generation of a SIP INVITE, or an instant messaging request arising from an IM application operating from a computer of the party. The communication origination signals can be directed by network elements of communication systems 100 and 200 to the negotiation engine 706 and the metaphor engine 710 before it reaches a CD of the individual such as CD 202. The network elements can await instructions from the negotiation engine 706 which determines the degree of access provided to the individual.

In another embodiment, step 516 can represent an intermediate communication attempt by a party. For example, a party exploring the possibility of interacting with the individual can submit from a communication device of the party a request to communicate with the metaphor engine 710 (or the communication with the metaphor engine 710 can be continuous) in step 516 to determine from a metaphor expression of the individual's activities whether interaction with the individual is desirable. If the party determines that an interaction is desirable, the party can cause the communication device of the party (such as a computer, STB, cellular phone, etc.) to initiate a communication origination request to a communication device of the individual (e.g., office phone). If the party determines that interacting with the individual is not desirable, the party can terminate communications with the metaphor engine 710 without invoking a communication origination request.

In step 518 the metaphor engine 710 can generate a metaphor that expresses the mood of the individual. To perform this function, the metaphor engine 710 can determine a metaphor type from the measure of the mood and the party's identification (ID) which can be determined by common signaling techniques. The metaphor type can be, for example, a synthesized metaphor, an actual metaphor, or a combination thereof.

If the metaphor type is a synthesized metaphor, the metaphor engine 710 can generate a synthesized audible metaphor according to the measure of the mood. A synthesized audible metaphor can represent synthesized audio generated from a metaphorical interpretation of the measure of the mood of the individual. The measure of the mood can indicate, for example, a context of activity such as the individual is at the office working from his/her computer. The context of activity can be used to generate synthesized audio in the form of someone typing on a keyboard to express a synthesized audible metaphor. If the context of activity indicates the individual is resting, or sleeping, the synthesized audible metaphor can be represented by synthesized audio in the form of someone lightly snoring.

Figure 10:
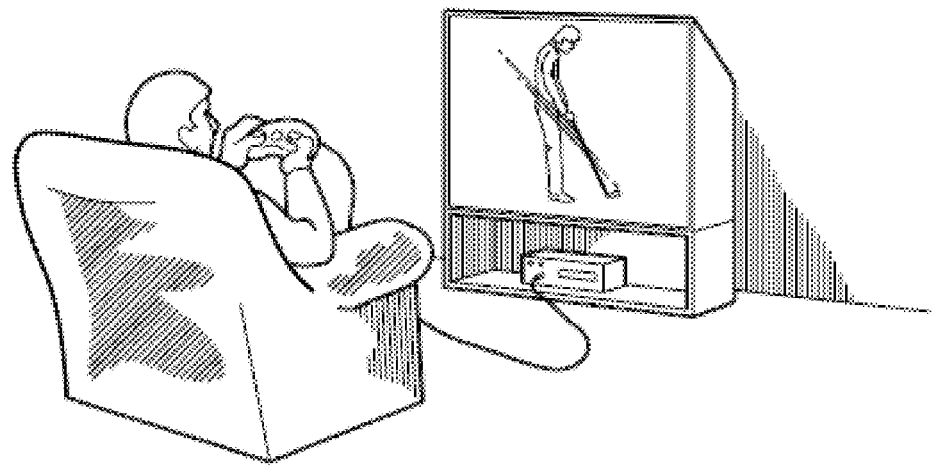
FIGS. 10-23 depict illustrative embodiments of metaphors for describing the individual's mood according to the methods of FIGS. 5-6.

The metaphor engine 710 can also generate a synthesized image metaphor according to the measure of the mood of individual. The metaphor engine 710 can, for example, use the context of activity of the individual (CAn), and the metaphorical expression (MEn) to generate a synthesized image metaphor to suitably represent the mood of the individual. For example, suppose the context of activity identified by the measure of the mood of the individual indicates the individual is playing a video game by way of a gaming console. To illustrate this activity, the metaphor engine 710 can generate a synthesized image metaphor such as shown in FIG. 10. The synthesized image metaphor can be a still or moving image. In this illustration, the synthesized audible metaphor can represent sounds typically heard with video games.

Figure 11:
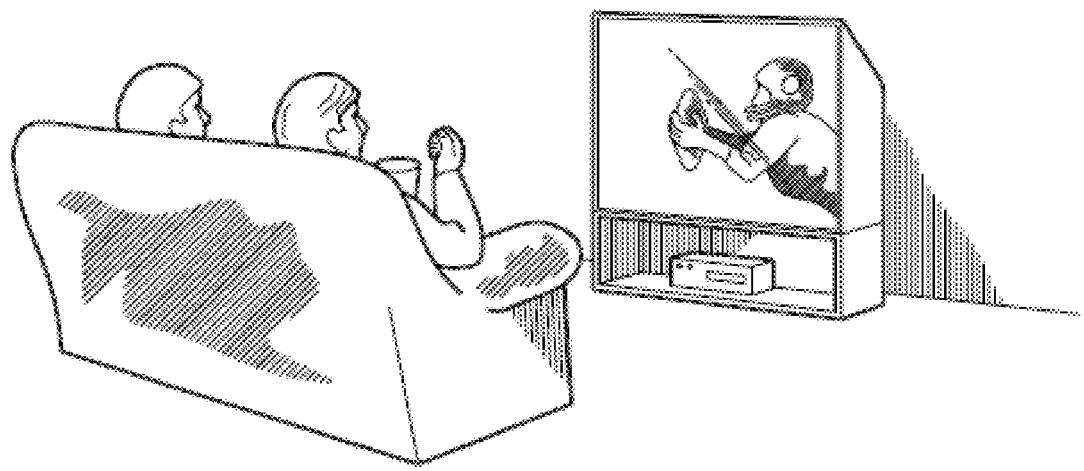
Figure 12:
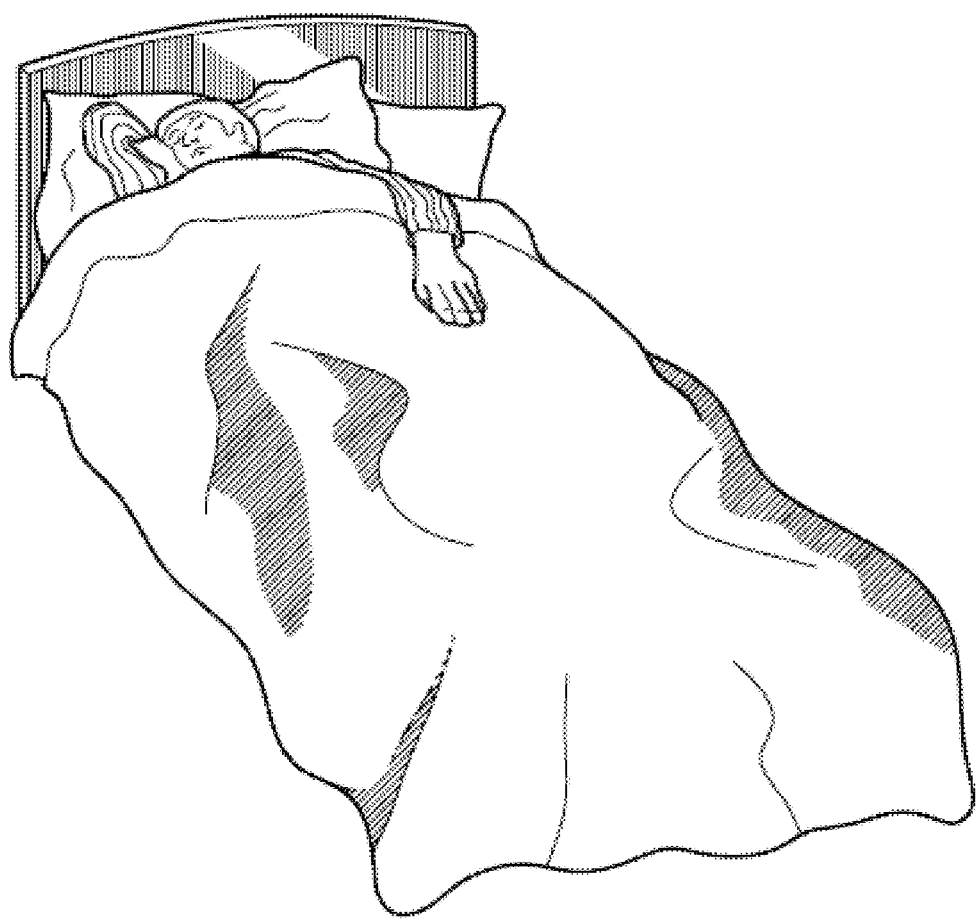

Suppose instead the context of activity indicates the individual is entertaining a guest while viewing a football game. To illustrate this activity, the metaphor engine 710 can generate a synthesized image metaphor such as the one shown in FIG. 11. As before, the synthesized image metaphor can be a still or moving image. The synthesized audible metaphor can generate sounds typically heard during a football game. In yet another illustrative embodiment, suppose the context of activity indicates the individual is resting. To illustrate this activity, the metaphor engine 710 can generate a synthesized image metaphor such as shown in FIG. 12 with a synthesized audible metaphor of someone lightly snoring.

When the metaphor type is an actual metaphor, the metaphor engine 710 can be programmed to receive audio and/or image information in a vicinity of the individual. A microphone of a communication device such as a landline phone, mobile phone, computer, or web camera located in the vicinity of the individual can receive ambient sound and generate with a common audio circuit the audio information. The metaphor engine 710 can selectively enable the communication device of the individual to monitor audio information with or without notifying the individual. Similarly, the metaphor engine 710 can direct the same or another communication device in the vicinity of the individual with image sensing capability (such as a web camera) to intercept and transmit images to the metaphor engine 710—again with or without notifying the individual. The images can be still or moving images showing the individual and/or his or her surroundings. The audio and image information collected by the metaphor engine 710 collectively become audible and image metaphors.

Figure 13:
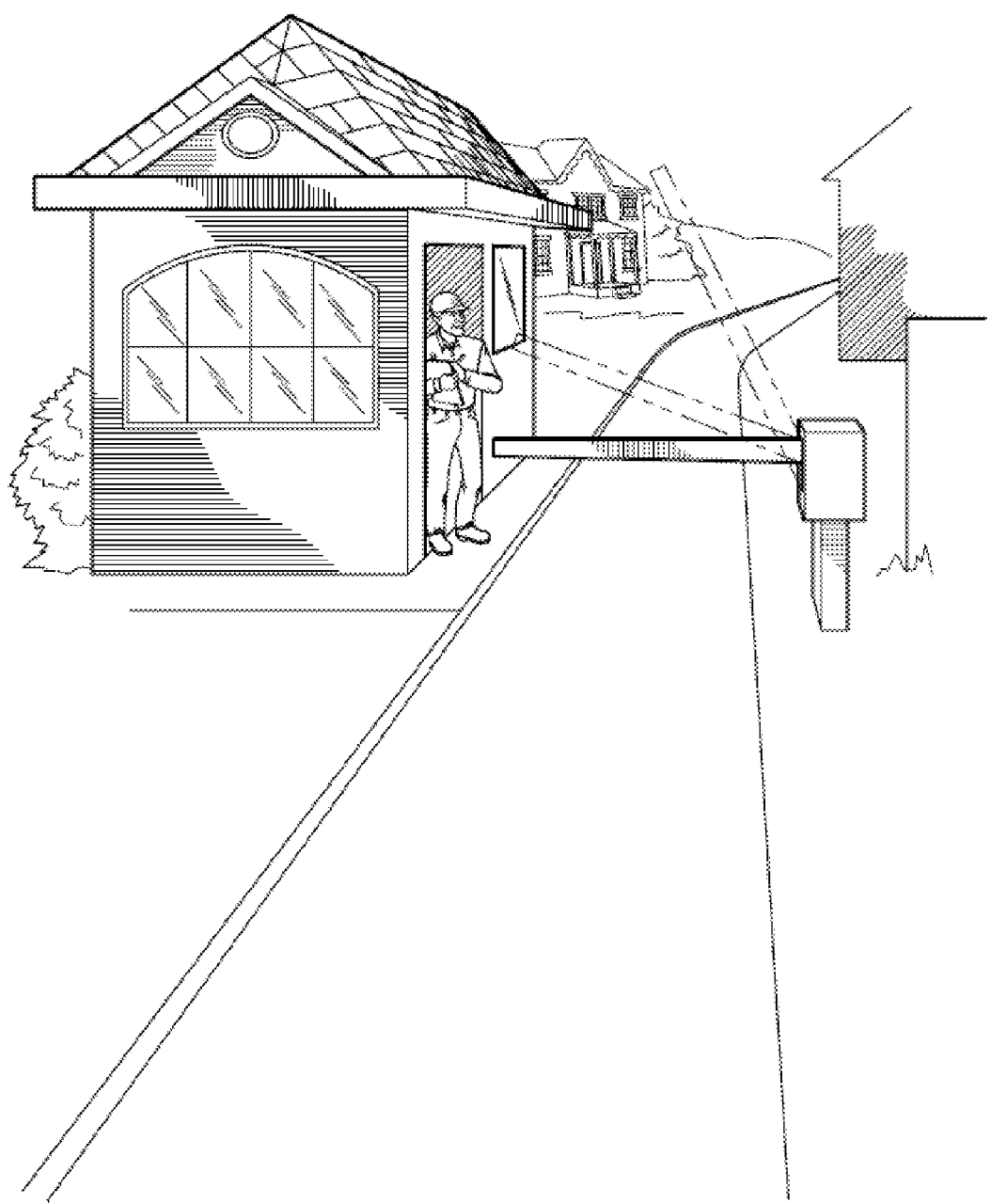
Figure 14:
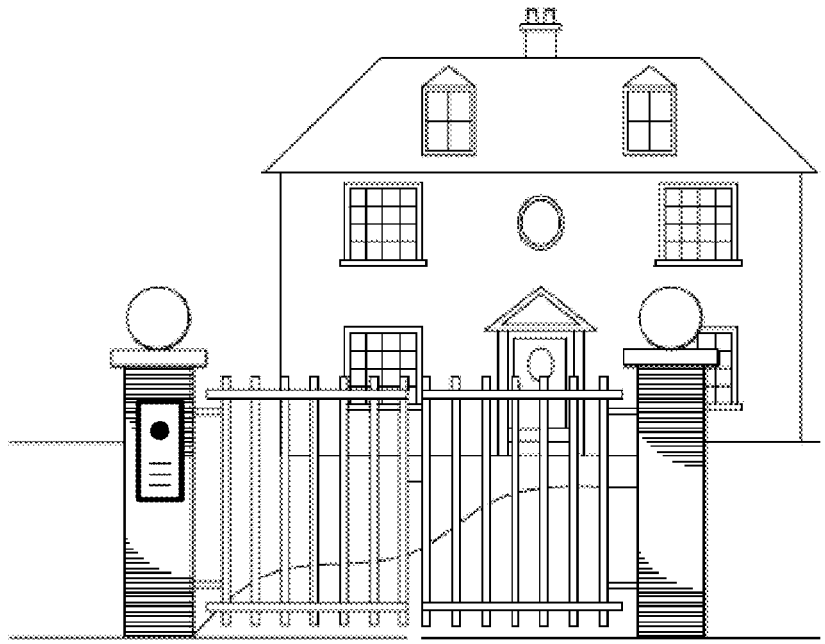
Figure 15:
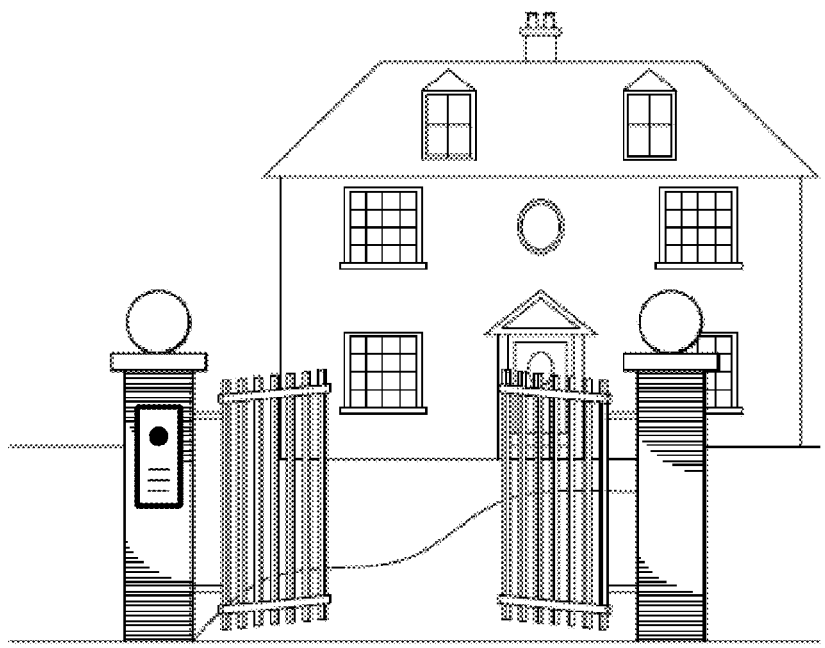
Figure 16:
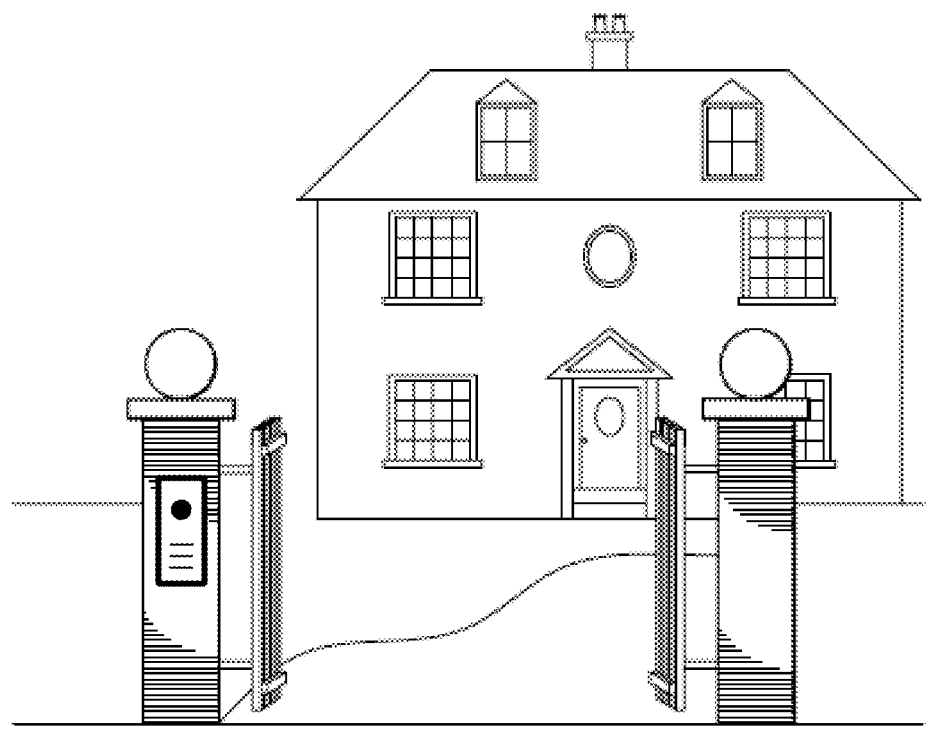

The metaphor engine 710 can also determine if nested metaphors will be used. If so, nested metaphors can be created by the metaphor engine 710. FIGS. 13-18 illustrate nested metaphors in a private setting, while FIGS. 19-23 illustrate nested metaphors in a work setting. FIG. 13 for instance can be a first metaphor which a party requesting to interact with the individual can be presented. This metaphor can be used when the identification of the party is not recognized, or is not considered a close relationship of the individual. The position of the gate (down, half-way, and up) can indicate to the party the receptiveness of the individual to communicate with the party.

Figure 17:

The first metaphor can also be accompanied by an intermediary, in this illustration a guard, which can communicate with the party as directed by the intermediary engine 708 and the negotiation engine 706 to determine if the party will be allowed to pass the gate into the metaphorical housing subdivision of the individual. Once the party is allowed to enter the subdivision metaphor, the gate position of the individual's residence can be presented according to one of the illustrations shown in FIGS. 14-16, or a residence that lacks a gate as shown in FIG. 17.

Figure 18:
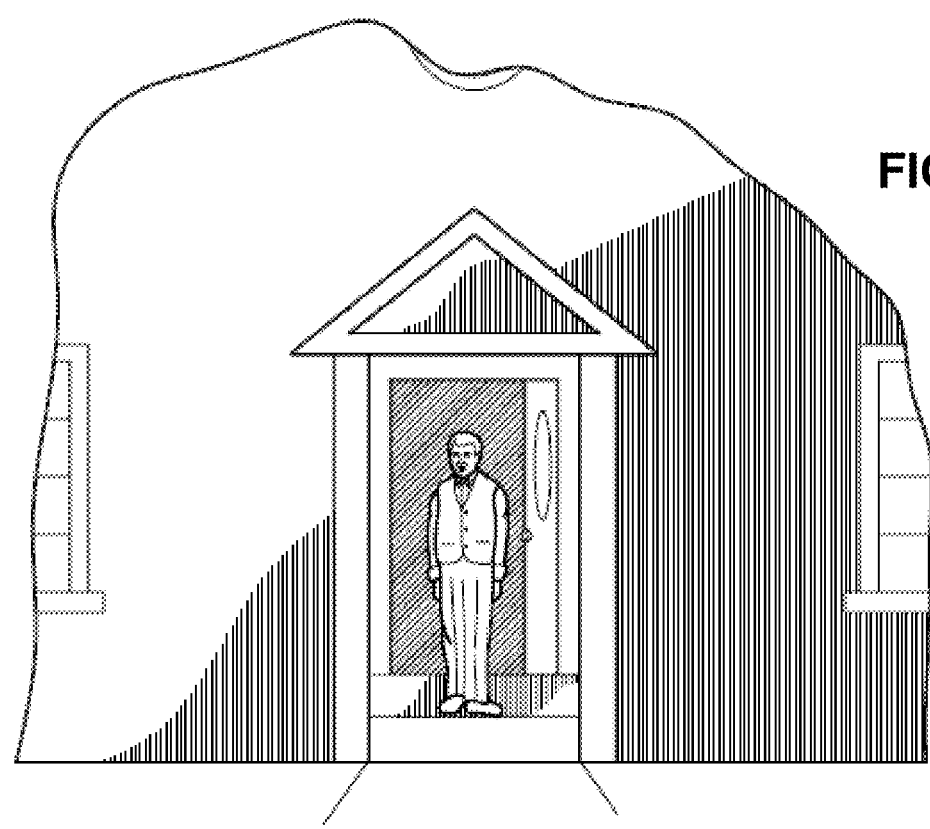

The gate positions and the lack of a gate can also indicate a receptiveness of the individual to interact with the party. The embodiment of FIG. 14 with a closed gate can be configured to require the party to engage a speakerphone located at the left column of the gate to request entry to the residence. The speakerphone can serve as an intermediary managed by the negotiation engine 706. The party can also be presented with another intermediary (e.g., a butler) at the front door, such as shown in FIG. 18, to greet the party as directed by the intermediary engine 708 and the negotiation engine 706 and to determine if the party will be allowed to enter the individual's home.

Figure 19:
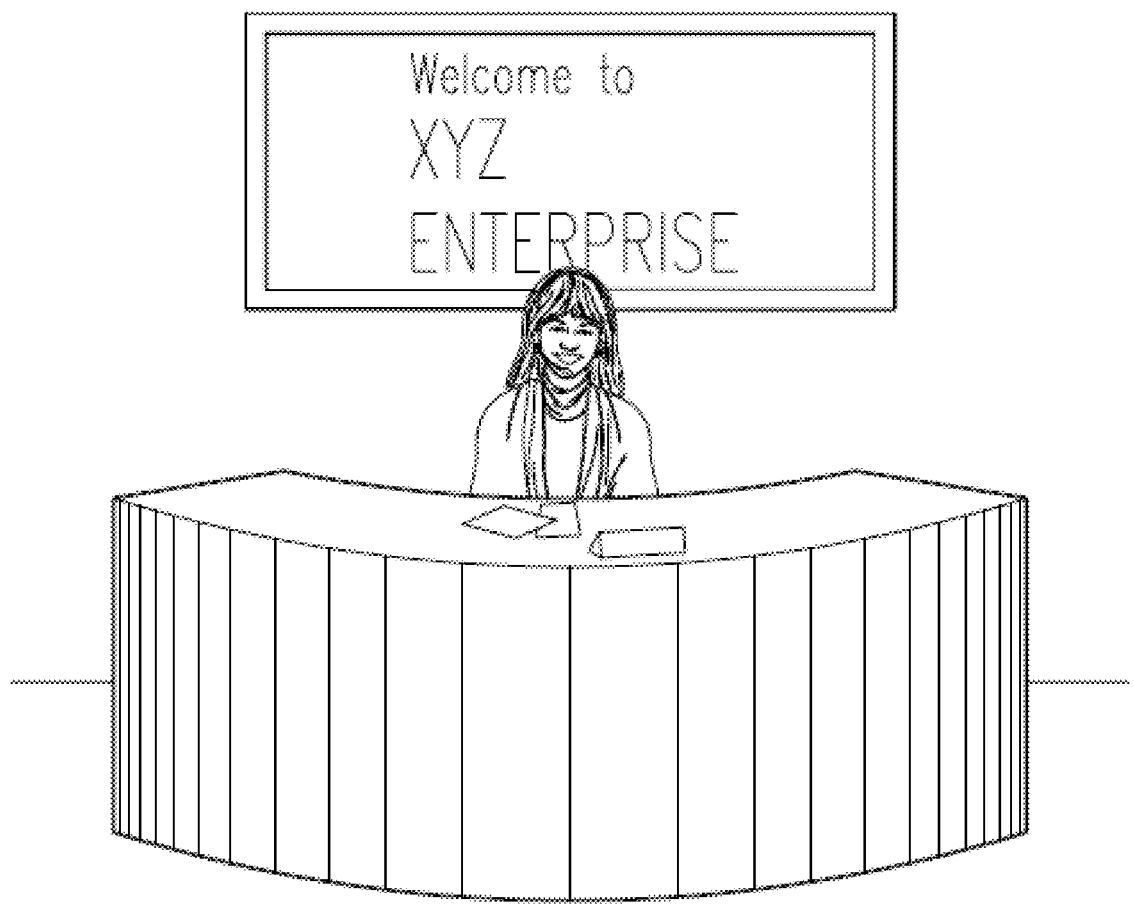
Figure 20:
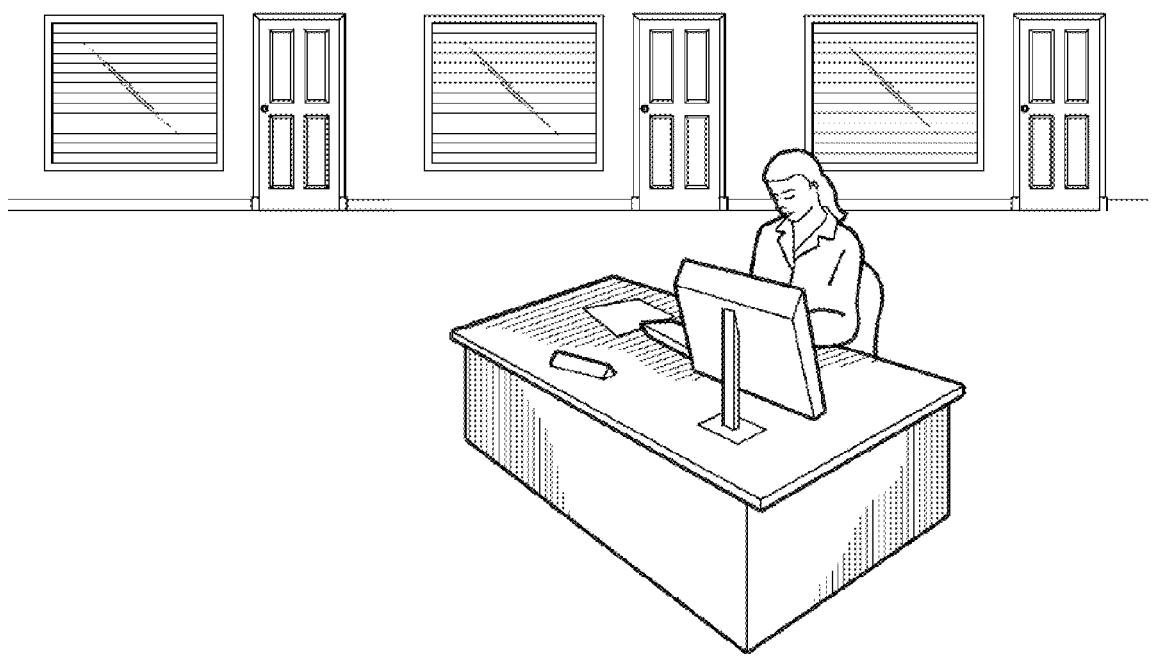

In a work setting, the party can be greeted by a receptionist metaphor as shown in FIG. 19. The receptionist metaphor can also be controlled by the intermediary engine 708 and negotiation engine 706 to determine whether the party will be allowed to proceed to, for example, the individual's administrative assistant such as shown in FIG. 20. The administrative assistant can also interact with the party as directed by the intermediary engine 708 and negotiation engine 706. The party can also visualize the receptiveness of the individual to interact with the party according to the position of the shades and door of the individual's office.

Figure 21:
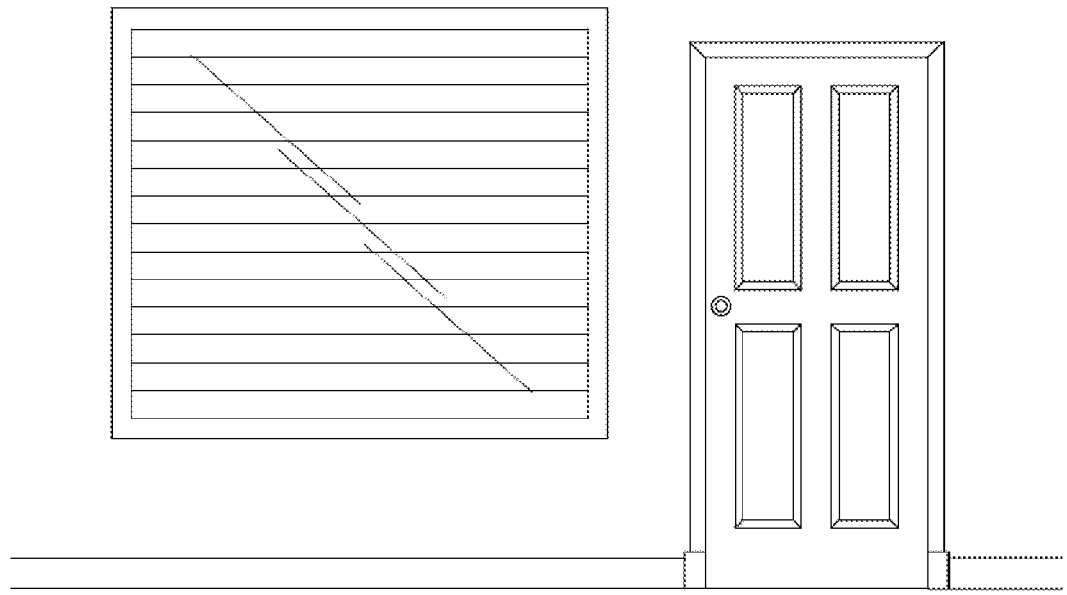
Figure 22:
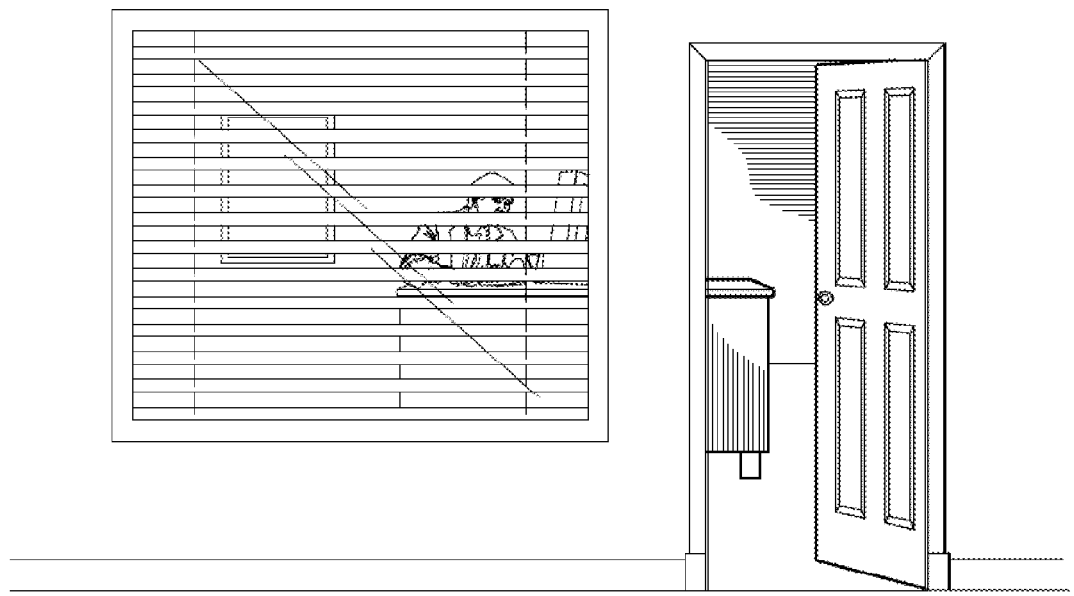
Figure 23:
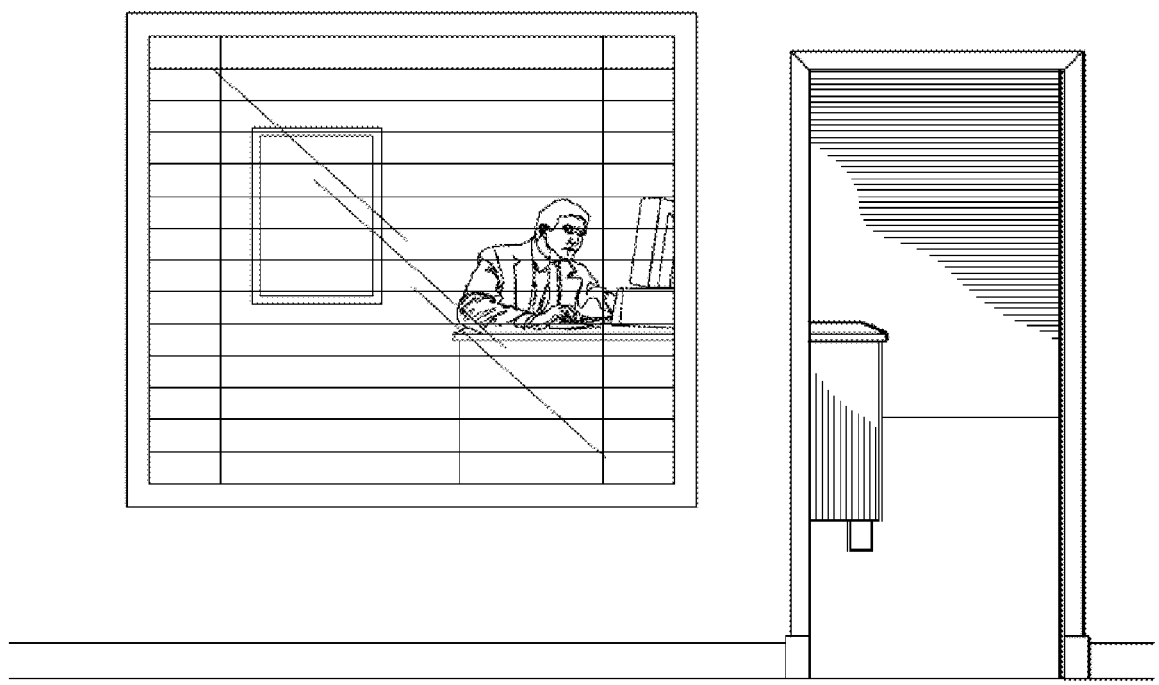

For example, FIG. 21 depicts a situation where the individual has a closed door, and closed shades. The party can interpret from this metaphor that the individual may not want to be disturbed. FIG. 22 illustrates a partially opened door and shade, which may indicate the individual is busy but can be disturbed by the party if the need for interacting is important. FIG. 23 depicts a situation where the shades and the door are in a fully opened position. Additionally, the metaphor shows that the individual is using his computer. This metaphor can indicate that the individual is also busy, but is less resistive to interacting with the party than the metaphor presented in FIG. 22.

The concept of nested metaphors can be extended also to a single image metaphor. For example, disclosing what's behind an office window or door can represent a nested metaphor. The door or the window can be a first-level metaphor, while the disclosure behind the window or door can represent a second-level metaphor. It would be appreciated by one of ordinary skill in the art that there are innumerable ways to present image metaphors to describe the measure of the mood of the individual that have not been presented in the present disclosure for practical reasons.

For instance, the shades shown in FIGS. 21-23 can be removed, and replaced with a variable opacity of the window to vary the exposure of the individual's activities. The less receptive the individual is to interact with the party, the more opaque the window can be, and vice-versa. Also, when transitioning between nested metaphors, animation can be used to indicate to the party that the some level of progress to reach the individual is being made (e.g., the guard in FIG. 13 does something to raise the gate, the gates in FIG. 14 slowly open, etc.). Other possible embodiments of an image metaphor that can be used to convey the individual's willingness or receptiveness to interact with a party are contemplated by the present disclosure.

Once the metaphor has been created and presented to the party in step 518, the negotiation engine 706 in step 520 can determine a negotiation strategy according to the negotiation strategy (NSn) of FIG. 8 in relation to the scenario associated with the party requesting to interact with the individual. In step 522, the negotiation engine 706 can determine from the negotiation strategy whether negotiations are necessary. The negotiation strategy can for example indicate that based on the identity of the party negotiations are not required (e.g., no negotiations when spouse or boss calls). Accordingly, the party can initiate interactions with the individual in step 536 without intermediate negotiations.

If negotiations are required and the party persists in requesting an interaction with the individual, the negotiation engine 706 can proceed to step 524 where it invokes an intermediary to interact with the party such as shown in FIGS. 13, and 18-20. Persistence can be detected when the party invokes a communication origination request over the IMS network 250. If persistence is not detected such as a result of the party terminating communications with the metaphor engine 710, the negotiation engine 706 can conclude monitoring the party's actions.

Figure 6:
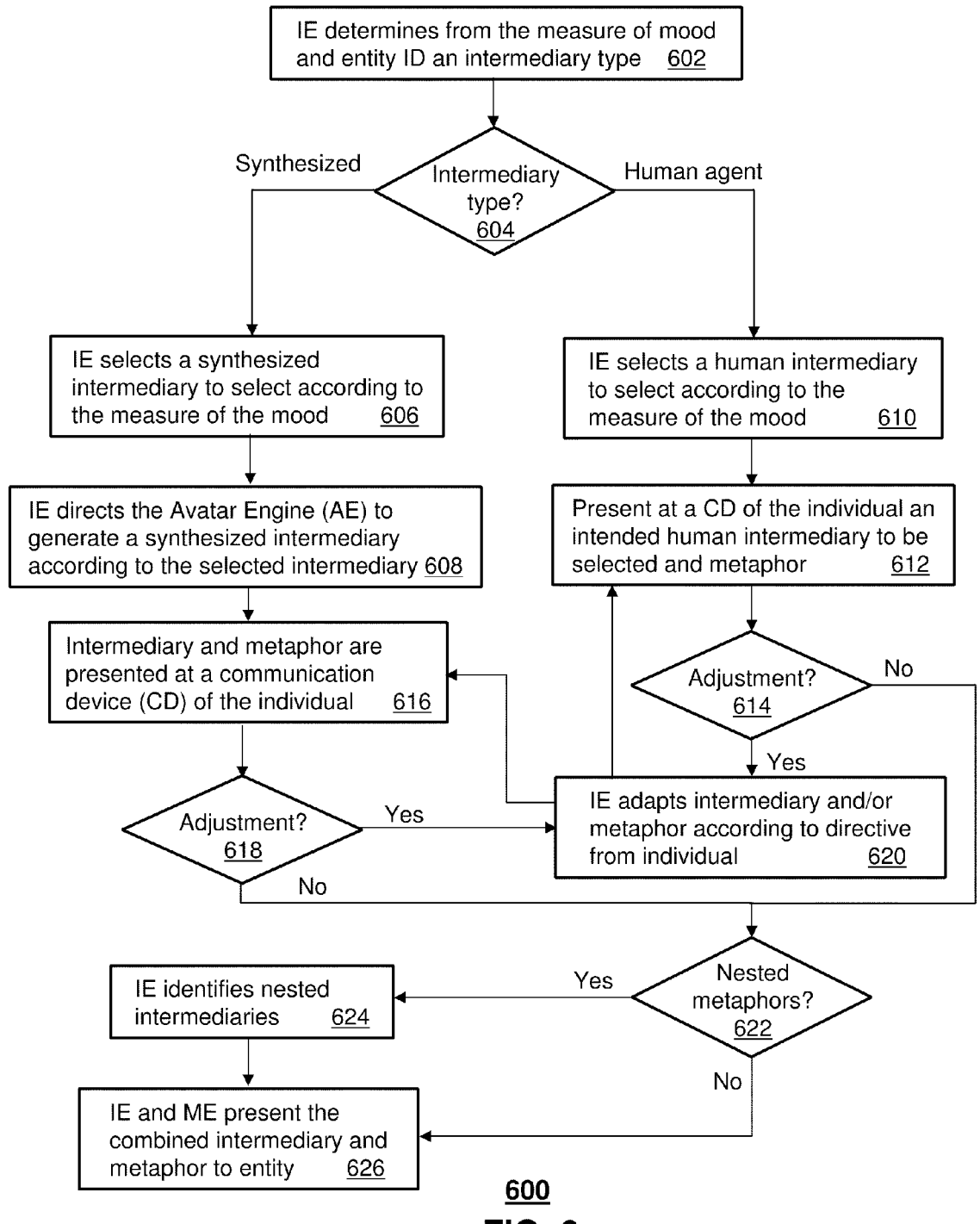

If persistence is detected, the intermediary engine 708 can be directed in step 524 by the negotiation engine 706 to invoke an intermediary. The intermediary generated by the intermediary engine 708 in step 524 can be described by an illustrative embodiment of a method 600 depicted in FIG. 6 for directing the operations of a communication system 900 of FIG. 9.

Figure 9:
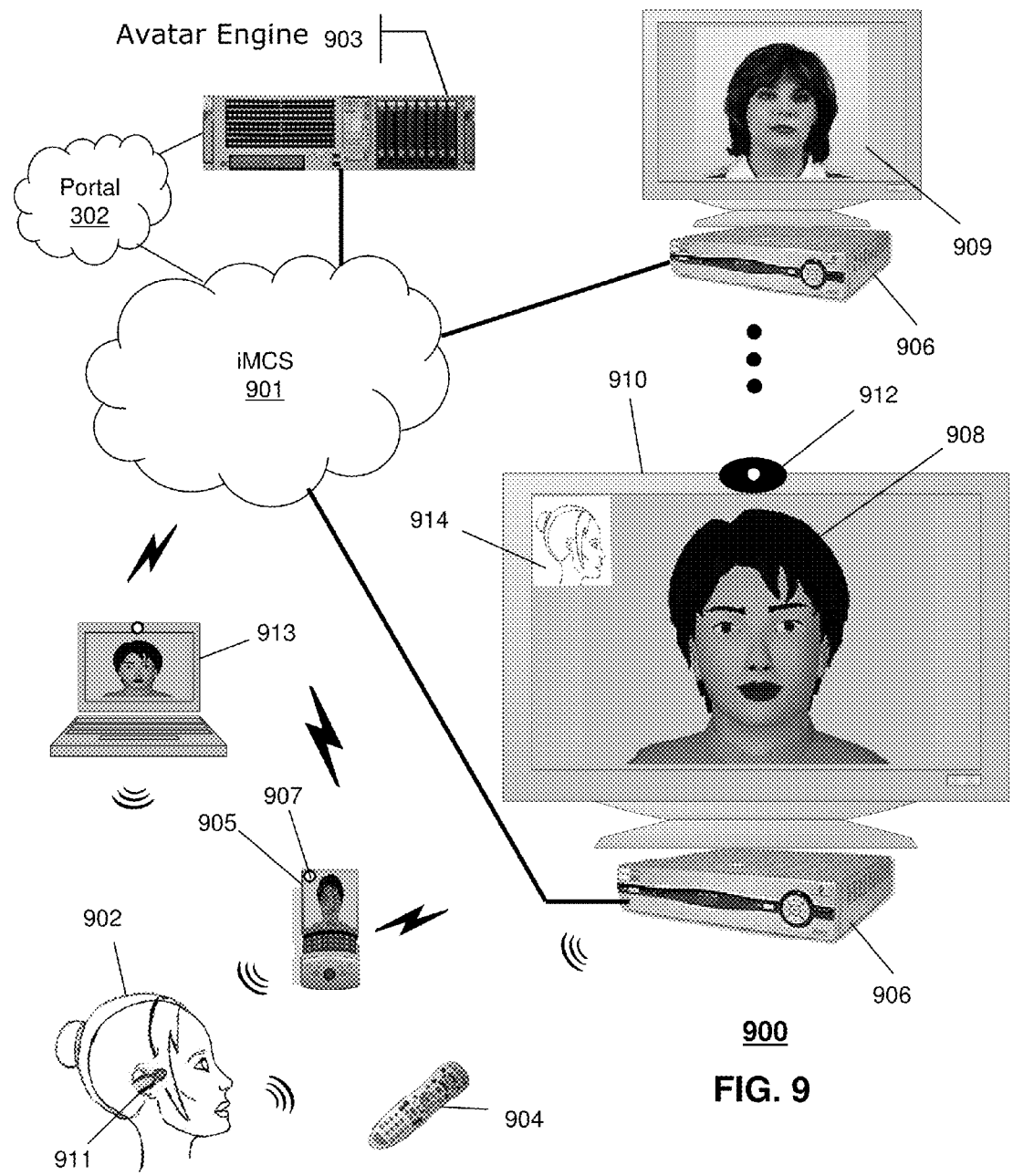
FIG. 9 depicts an illustrative embodiment of an avatar engine operatively coupled to or an integral part of the system of FIG. 7.

FIG. 9 depicts an interactive media communication system (iMCS) 901 which can represent the communication systems of FIGS. 1-2 singly or collectively. The iMCS 901 can be coupled to the portal 302 (previously described in FIG. 3), an avatar engine 903, and one or more STBs 906. Common computer animation technology can enable the real-time synthesis of animated avatar images such as the avatar image 908 and the avatar images in FIGS. 13, 18-20, or faces that look like actual people such as the avatar image 909. Common speech recognition, natural language interpretation and speech synthesis technology can be used to synthesize conversational interfaces. Collectively, these technologies can be used by the avatar engine 130 to produce human-like or animated interactive avatars. The avatar engine 903 can be operably coupled to or an integral part of the intermediary engine 708 of FIG. 7 to invoke synthesized intermediaries such as avatars with animated or human-like appearance. The intermediary engine 708 can also direct human agents to act as intermediaries as will be described by method 600.

The STBs 906 can be operatively coupled to media presentation devices such as a high-definition television (HDTV) 910 which can present avatar images 908 supplied by the avatar engine 903 by way of the STBs 906. A user 902 of the STB 906 can interact with the avatar image 908 by speech as well as tactile controls using a remote control 904. The HDTV 910 can have a common camera sensor 912 for capturing still and/or moving images of the user 902, which can be displayed in part by the HDTV as a picture-in-picture (PIP) image 914. The visual images of the user can be conveyed to the STB 906. Speech can be detected by a microphone of an audio system of the remote control 904 or an audio system of the STB 906. The STB 906 can transmit to the avatar engine 903 the visual images as well as speech signals of the user 902 for analysis.

The avatar engine 903 can also be communicatively coupled to a mobile phone 905 with a camera 907 that can convey still or moving images of the user 902 to the avatar engine 903. The mobile phone 905 can have an audio system for receiving responses of the user 902 and for conveying the user's speech to the avatar engine 903. The audio system can also have a loudspeaker to convey to the user 902 synthesized speech of the avatar 908 for hands-free operations. To avoid disturbing others, the mobile phone 905 can also incorporate common Bluetooth wireless transceiver technology to communicate with a common Bluetooth headset 911 worn by the user 902. Similarly, the avatar engine 903 can be communicatively coupled to a computer 913 with similar resources as the mobile phone 905.

With communication system 900 in mind, the intermediary engine 708 can apply method 600 for purposes of invoking in step 524 an intermediary as directed by the negotiation engine 706 in step 522. Method 600 can begin with step 602 in which the intermediary engine 708 determines from the measure of the mood and entity ID an intermediary type. The entity ID can be a caller ID derived from the communication session initiated by the entity (party). The intermediary type can be determined from the intermediary dimension (IMn), which can identify the need for a synthesized intermediary or human intermediary in step 604. A synthesized intermediary can represent human-like or animated interactive avatar as described in FIG. 9. The intermediary dimension (IMn) can be used by the intermediary engine 708 to select in step 606 a synthesized intermediary in the form of for example an interactive avatar.

In step 608, the intermediary engine 708 can direct the avatar engine 903 to generate as described earlier a synthesized intermediary in the form of an interactive avatar according to the selected intermediary. The interactive avatar generated by the avatar engine 903 can then be combined with the metaphor generated by the metaphor engine 710 and presented at a communication device (e.g., computer, TV, mobile phone, etc.) of the individual in step 616. The combined avatar and metaphor can be represented by for example one of FIGS. 13, 18-20. In step 618, the individual can be provided options to accept the interactive avatar and metaphor in its present condition, or perform adjustments. The individual can provide system 700 directives in the form of adjustments by selecting drop down menus to change the interactive avatar, change the metaphor or both. The individual can also be presented with qualitative means for adjusting the interactive avatar and metaphor. In an embodiment, the interactive avatar can be adapted by selecting from a menu a variety of facial, body or dress features presented at the communication device of the individual. The metaphor can be adapted by similar means.

If the individual chooses to accept the interactive avatar and metaphor as presented, the intermediary engine 708 can proceed to step 622. Otherwise, the intermediary engine 708 can proceed to step 620 where it adapts the intermediary and/or metaphor as directed by the individual. The intermediary engine 708 can return to step 616 where it presents the adapted intermediary and/or metaphor at the communication device of the individual and thereby provides the individual an opportunity to accept or make additional modifications in steps 618-620.

Referring back to step 604, if instead the intermediary type is a human agent, the intermediary engine 708 can proceed to step 610 where it selects a human agent from a list of possible agents to act as an intermediary on behalf of the individual. In a work setting, the intermediary dimension (IMn) can identify a live receptionist or secretary of the individual. In personal setting, the intermediary can be a live butler. In step 612, the intermediary engine 708 can present the communication device of the individual an identification of the human agent selected (secretary, receptionist, butler, etc.) and the selected metaphor. In step 614, the individual can decide to choose another human intermediary (e.g., switch from receptionist to secretary), and/or make adjustments to the metaphor as discussed earlier in step 620 until the individual has achieved a desirable outcome.

In step 622, the intermediary engine 708 can also check whether nested metaphors are to be used. If nested metaphors are being used, the intermediary engine 708 in step 624 identifies the intermediaries, if any, that should be associated with each nested metaphor. For example, in the nested metaphors of FIGS. 13-18, only FIGS. 13 and 18 require intermediaries (guard and butler). In the nested metaphors of FIGS. 19-23, only FIGS. 19-20 require intermediaries (receptionist and administrative assistant). In step 626, the intermediary engine 708 and metaphor engine 710 present the entity the combined intermediary and metaphor. Collectively, the foregoing steps can be a representative embodiment of step 524 of FIG. 5. It should be noted that steps 518-524 and method 600 can occur in a rapid sequence such that it appears to the party requesting to communicate with the individual that the intermediary is presented contemporaneously with the metaphor image.

In step 526, the intermediary engine 708 can receive instructions from the negotiation engine 706 for directing negotiations between the intermediary (avatar such as butler or human agent such as receptionist) and the party requesting to interact with the individual. The responses of the party can be recorded by the intermediary by common means (e.g., speech recognition, or text messaging by a human agent), which can be conveyed by the intermediary engine 708 to the negotiation engine 706 in step 528.

In step 532, the network element directs the metaphor engine and the intermediary engine to the next metaphor and adapted intermediary if progress is made. In step 530, the negotiation engine 706 can determine if the metaphor engine 710 has provided nested metaphors. If so, the negotiation engine 706 can direct the metaphor engine 710 to proceed to the next metaphor if progress is made in the negotiations as determined by the negotiation engine 706 by the responses received in step 528. When transitioning between nested metaphors, the intermediary engine 708 can adapt or change intermediaries consistent with the nested intermediaries identified in step 624 of FIG. 6.

The negotiation engine 706 can also determine at step 534 whether to provide the party access to the individual at step 536, continue negotiations at steps 526-528 by way of the intermediary, or terminate communications with the party. If the negotiation engine 706 decides to transition from step 534 to step 536, the degree of access provided to the party may be partial or unlimited.

Suppose for instance, the individual is in the midst of watching a football game. The synthesis engine 702 can determine from the behavioral profile that the individual does not like to engage in voice communications during this time, but has accepted on prior occasions to engage in instant messaging communications. The behavioral profile can also indicate that the individual will accept voice communications during a football game when the requesting party is a close friend or family and the request is urgent. With this understanding, the negotiation engine 706 can determine in step 534 that providing the party instant messaging access to the individual would be acceptable to the individual, while voice communication would be undesirable if the party did not indicate in the communication exchange with the intermediary that the call was urgent.

Upon reviewing the aforementioned embodiments, it would be evident to an artisan with ordinary skill in the art that said embodiments can be modified, reduced, or enhanced without departing from the scope and spirit of the claims described below. Accordingly, the reader is directed to the claims section for a fuller understanding of the breadth and scope of the present disclosure.

Figure 24:
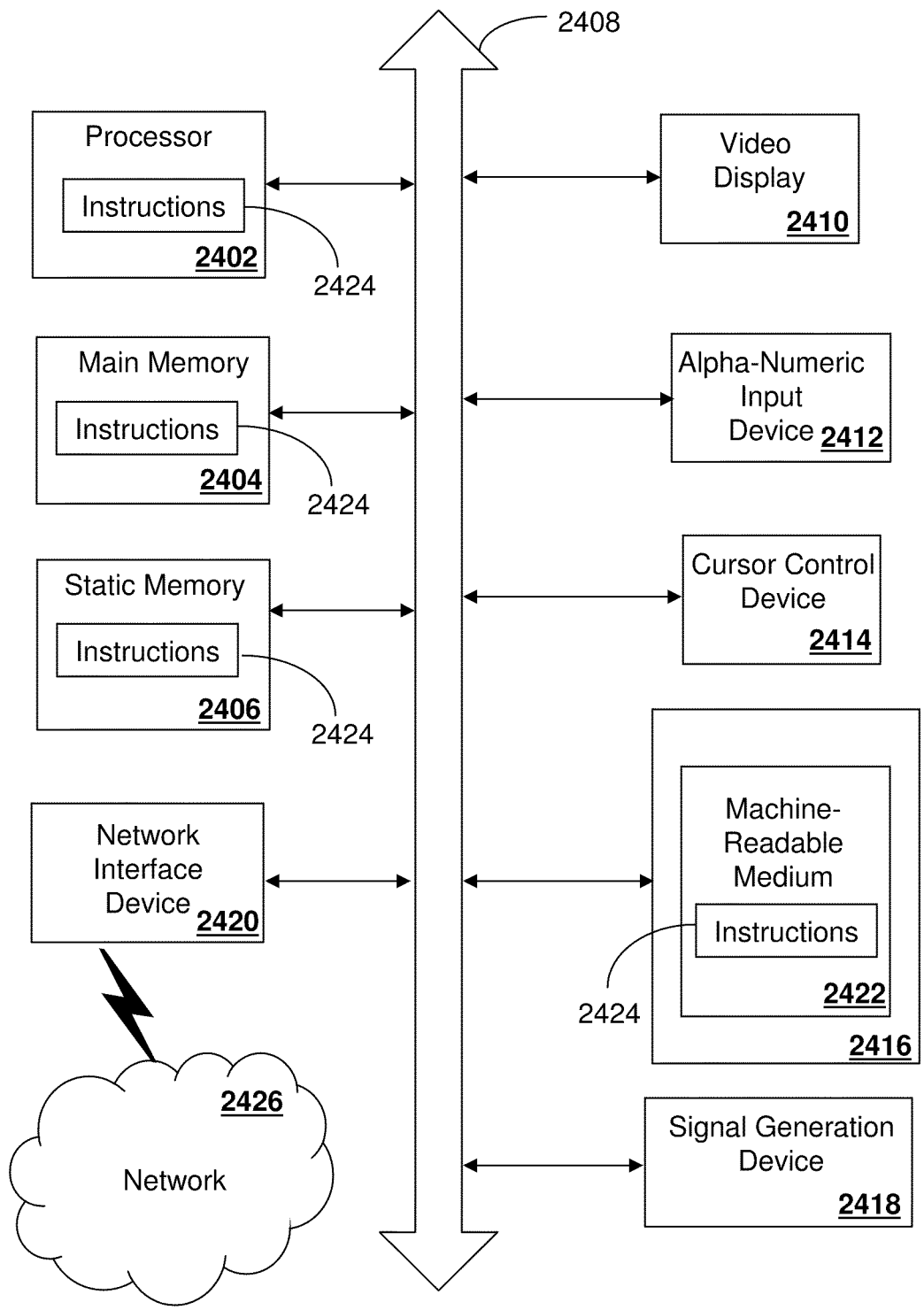
FIG. 24 is a diagrammatic representation of a machine in the form of a computer system within which a set of instructions, when executed, may cause the machine to perform any one or more of the methodologies discussed herein.

FIG. 24 depicts an exemplary diagrammatic representation of a machine in the form of a computer system 2400 within which a set of instructions, when executed, may cause the machine to perform any one or more of the methodologies discussed above. The computer system 2400 in whole or in part can be a representative embodiment of the synthesis engine 702, the collection engine 704, the negotiation engine 606, the intermediary engine 708, and the metaphor engine 710. It is also contemplated that the computer system 2400 in whole or in part can also be a representative embodiment of other devices described in the present disclosure such as the devices illustrated in FIGS. 1-4. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 2400 may include a processor 2402 (e.g., a central processing unit (CPU), a graphics processing unit (GPU, or both)), a main memory 2404 and a static memory 2406, which communicate with each other via a bus 2408. The computer system 2400 may further include a video display unit 2410 (e.g., a liquid crystal display (LCD), a flat panel, a solid state display, or a cathode ray tube (CRT)). The computer system 2400 may include an input device 2412 (e.g., a keyboard), a cursor control device 2414 (e.g., a mouse), a disk drive unit 2416, a signal generation device 2418 (e.g., a speaker or remote control) and a network interface device 2420.

The disk drive unit 2416 may include a machine-readable medium 2422 on which is stored one or more sets of instructions (e.g., software 2424) embodying any one or more of the methodologies or functions described herein, including those methods illustrated above. The instructions 2424 may also reside, completely or at least partially, within the main memory 2404, the static memory 2406, and/or within the processor 2402 during execution thereof by the computer system 2400. The main memory 2404 and the processor 2402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 2424, or that which receives and executes instructions 2424 from a propagated signal so that a device connected to a network environment 2426 can send or receive voice, video or data, and to communicate over the network 2426 using the instructions 2424. The instructions 2424 may further be transmitted or received over a network 2426 via the network interface device 2420.

While the machine-readable medium 2422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An intermediary engine, comprising:
   a hardware processor; and
   a non-transitory storage device for storing instructions to be executed by the hardware processor;
   wherein the instructions, when executed by the hardware processor, cause the hardware processor to perform operations comprising:
   receiving a measure of a mood of an individual, wherein the measure of the mood is synthesized from changes that are identified in collected information associated with a behavior of the individual, wherein the collected information includes one of media content consumed by the individual, images of the individual captured by a group of cameras at a plurality of locations, audio recordings of the individual captured by a plurality of end user devices or a combination thereof, wherein the mood indicates an availability of the individual and a receptiveness of the individual to accept a request to interact with an entity, wherein the measure of the mood includes a group of dimensions comprising a first dimension identifying a plurality of metaphor expressions to express the mood of the individual to interact with the entity, a second dimension identifying a plurality of techniques to disclose activities of the individual to the entity, and a third dimension identifying a group of strategies to provide the entity a degree of access to the individual;
   selecting an interactive avatar having characteristics determined from the measure of the mood of the individual;
   presenting the interactive avatar; and
   managing interactions between the individual, the interactive avatar and the entity according to a selected strategy that is selected from among the group of strategies according to the measure of the mood of the individual, wherein the group of strategies is pre-determined and stored, wherein the managing of the interactions includes generating queries for presentation via the interactive avatar and performing actions by the interactive avatar responsive to user input responding to the queries, wherein the queries and the actions are selected from pre-determined queries and pre-determined actions identified by the selected strategy,
   wherein weighting factors are applied to the collected information for synthesizing of the changes, wherein the images of the individual captured by the group of cameras at the plurality of locations are utilized for determining activities of the individual and environments of the individual, and wherein the group of dimensions of the measure of the mood includes a fourth dimension identifying a plurality of intermediaries to negotiate with the entity the degree of access to the individual, and a fifth dimension identifying a plurality of parties and context of activities of the individual to create a plurality of multidimensional scenarios.

2. The intermediary engine of claim 1, wherein the selected strategy is selected by a strategy engine, and wherein the selected strategy comprises a flowchart of the pre-determined queries and the pre-determined actions.

3. The intermediary engine of claim 1, wherein the hardware processor when executing the instructions performs operations comprising:
   selecting a human agent according to the measure of the mood of the individual; and
   providing communications between the entity and the human agent.

4. The intermediary engine of claim 3, wherein the hardware processor when executing the instructions performs operations comprising directing interactions between the human agent and the entity according to instructions received from a strategy engine.

5. The intermediary engine of claim 1, wherein the audio recordings of the individual captured from the plurality of end user devices are utilized for the determining of the activities of the individual and environments of the individual.

6. The intermediary engine of claim 5, comprising an interactive voice response system that interacts with the entity according to an audible speech exchange.

7. The intermediary engine of claim 1, wherein the interactive avatar is presented in combination with a metaphor created by a metaphor engine according to the measure of the mood of the individual to obtain a combined metaphor, and wherein the interactive avatar is presented based on a predicted behavior for the individual, wherein the predicted behavior is determined from monitoring of the activities of the individual and environments of the individual and is determined according to a current location of the individual.

8. The intermediary engine of claim 7, wherein the metaphor corresponds to a first nested metaphor of a plurality of nested metaphors.

9. The intermediary engine of claim 8, wherein the operations further comprise:
receiving from a strategy engine a directive to change the interactive avatar responsive to the metaphor engine switching to a second nested metphor the plurality of nested metaphors; and
presenting a new intermediary in combination with the second nested metaphor of the plurality of nested metaphors.

10. The intermediary engine of claim 9, wherein the new intermediary comprises another interactive avatar.

11. The intermediary engine of claim 7, wherein the operations further comprise selecting the interactive avatar from a plurality of selectable interactive avatars according to a context of the metaphor.

12. The intermediary engine of claim 11, wherein the context of the metaphor comprises an occupational context.

13. The intermediary engine of claim 7, wherein the operations further comprise:
presenting the combined metaphor and interactive avatar at a communication device of the individual;
receiving from the communication device a directive to modify at least a portion of the combined metaphor and interactive avatar to generate an updated combined metaphor and interactive avatar; and
presenting the updated combined metaphor and interactive avatar to the entity requesting to interact with the individual.

14. The intermediary engine of claim 1, wherein the operations further comprise invoking and presenting the interactive avatar responsive to a strategy engine directing the intermediary engine to invoke the interactive avatar and the measure of the mood of the individual being less than receptive to interact with the entity.

15. The intermediary engine of claim 1, wherein the hardware processor is in communication with an interactive television communication system for presentation of an interactive avatar.

16. The intermediary engine of claim 15, wherein the interactive television communication system comprises an internet protocol television communication system.

17. A non-transitory machine-readable storage device, comprising executable instructions, which when executed by a processor cause the processor to perform operations comprising:
receiving a measure of a mood of an individual to interact with an entity, wherein the measure of the mood is synthesized from identified changes in collected information associated with a behavior of the individual, wherein the measure indicates a receptiveness of the individual to accept a request from the entity to interact with the individual, wherein the collected information includes one of images of the individual captured by a group of cameras at a plurality of locations, audio recordings of the individual captured from a plurality of end user devices, or a combination thereof, wherein the measure of the mood includes a group of dimensions comprising a first dimension identifying a plurality of metaphor expressions to express the mood of the individual to interact with the entity, a second dimension identifying a plurality of techniques to disclose activities of the individual to the entity, and a third dimension identifying a group of strategies to provide the entity a degree of access to the individual;
invoking an intermediary according to the measure of the mood of the individual; and
managing interactions between the individual and the entity via the intermediary according to a selected strategy that is selected from among the group of strategies according to the measure of the mood of the individual, wherein the group of strategies is predetermined and stored, wherein the managing of the interactions includes generating queries and performing actions responsive to user input responding to the queries according to a flow chart of the selected strategy,
wherein the intermediary presented to the entity interacts with the entity by way of an audible speech exchange and an image exchange, wherein the collected information includes a frequency of use of media resources by the individual, subscriber service information from a subscriber account of the individual, and location data associated with the individual, and wherein the group of dimensions of the measure of the mood includes a fourth dimension identifying a plurality of intermediaries to negotiate with the entity the degree of access to the individual, and a fifth dimension identifying a plurality of parties and context of activities of the individual to create a plurality of multidimensional scenarios.

18. The non-transitory machine-readable storage device of claim 17, wherein the intermediary comprises an interactive avatar, wherein the operations further comprise presenting the interactive avatar to the entity requesting to interact with the individual, wherein the collected information includes media content consumed by the individual, wherein the images of the individual captured by the group of cameras at the plurality of locations are utilized for determining activities of the individual and environments of the individual, wherein the measure of the mood is synthesized from the identified changes without synthesizing all of the collected information, and wherein the queries are presented via the interactive avatar.

19. The non-transitory machine-readable storage device of claim 17, wherein the intermediary is a human agent, and wherein the storage device comprises computer instructions which when executed by the processor cause the processor to perform operations comprising directing interactions between the human agent and the entity according to instructions received from a strategy engine, wherein the audio recordings of the individual captured from the plurality of end user devices are utilized for determining activities of the individual and environments of the individual.

20. The non-transitory machine-readable storage device of claim 17, wherein weighting factors are applied to the collected information for synthesizing of the identified changes, wherein the intermediary is an interactive avatar, and wherein the operations further comprise directing interactions between the interactive avatar and the entity according to instructions received from a strategy engine.

21. The non-transitory machine-readable storage device of claim 17, wherein the operations further comprise presenting the intermediary in combination with a metaphor to obtain a combined metaphor.

22. The non-transitory machine-readable storage device of claim 21 wherein the operations further comprise:
receiving, from a strategy engine, a directive to adapt the intermediary responsive to a transition to another metaphor to generate an adapted intermediary; and
presenting the adapted intermediary.

23. The non-transitory machine-readable storage device of claim 21, wherein the operations further comprise selecting the intermediary from a plurality of selectable intermediaries according to a context of the metaphor, wherein the context of the metaphor comprises an occupational context, and wherein the metaphor comprises an image metaphor.

24. The non-transitory machine-readable storage device of claim 21, wherein the operations further comprise:
presenting the combined metaphor and intermediary at a communication device of the individual;
receiving from the communication device a directive to modify at least a portion of the combined metaphor and intermediary to obtain an updated combined metaphor and intermediary; and
presenting the updated combined metaphor and intermediary to the entity requesting to interact with the individual.

25. An avatar engine, comprising:
a hardware processor; and
a non-transitory storage device for storing instructions to be executed by the hardware processor;
wherein the instructions, when executed by the hardware processor, cause the hardware processor to perform operations comprising:
identifying an avatar according to a measure of a mood of an individual to interact with an entity, wherein the measure of the mood is received from a synthesis engine that synthesizes identified changes in collected information associated with a behavior of the individual, wherein weighting factors are applied to the collected information for synthesizing of the identified changes, wherein the measure of the mood indicates a receptiveness of the individual to accept a request from the entity to interact with the individual, and wherein the collected information includes images of the individual captured by a group of cameras at a plurality of locations that are utilized for determining activities of the individual and environments of the individual, wherein the measure of the mood includes a group of dimensions comprising a first dimension identifying a plurality of metaphor expressions to express the mood of the individual to interact with the entity, a second dimension identifying a plurality of techniques to disclose activities of the individual to the entity, and a third dimension identifying a group of strategies to provide the entity a degree of access to the individual;
accessing a selected strategy that is selected from among the group of strategies according to the measure of the mood of the individual, wherein the group of strategies is pre-determined and stored; and
presenting queries via the avatar according to a flowchart of the selected strategy, wherein the flowchart identifies a series of pre-determined queries responsive to user input,
wherein a communication exchange comprises a combined image and audible speech exchange, wherein the collected information includes media content consumed by the individual and audio recordings of the individual, and wherein the group of dimensions of the measure of the mood includes a fourth dimension identifying a plurality of intermediaries to negotiate with the entity the degree of access to the individual, and a fifth dimension identifying a plurality of parties and context of activities of the individual to create a plurality of multidimensional scenarios.

26. The avatar engine of claim 25, wherein the synthesis engine does not synthesize all of the collected information, wherein the operations further comprise:
engaging in the communication exchange with the entity by way of the avatar according to the series of the pre-determined queries.

27. The avatar engine of claim 25, wherein the collected information includes a frequency of use of media resources by the individual, subscriber service information from a subscriber account of the individual, location data associated with the individual, and wherein the operations further comprise:
selecting the avatar from a plurality of selectable avatars according to a directive received from a strategy engine and a context of a metaphor generated by a metaphor engine; and
presenting the avatar in combination with the metaphor created by the metaphor engine.

28. A method, comprising:
receiving, at a processor, a measure of a mood of an individual to interact with an entity that is based on a synthesis associated with collected information for a behavior of the individual, wherein the collected information includes one of media content consumed by the individual, images of the individual captured by a group of cameras at a plurality of locations that are utilized for determining activities of the individual and environments of the individual, audio recordings of the individual or a combination thereof, wherein the mood indicates an availability of the individual and a receptiveness of the individual to accept a request to interact with the entity, wherein the synthesis is of identified changes in the collected information without synthesizing all of the collected information, and wherein weighting factors are applied to the collected information for synthesizing of the identified changes, wherein the measure of the mood includes a group of dimensions comprising a first dimension identifying a plurality of metaphor expressions to express the mood of the individual to interact with the entity, a second dimension identifying a plurality of techniques to disclose the activities of the individual to the entity, and a third dimension identifying a group of strategies to provide the entity a degree of access to the individual; and
invoking, by the processor, an intermediary to interact with the entity responsive to the receiving of the measure of the mood, wherein the intermediary comprises an avatar that presents queries according to a flowchart of a selected strategy, wherein the flowchart identifies pre-determined queries responsive to user input, wherein the selected strategy is selected from among the group of strategies according to the measure of the mood of the individual, and wherein the group of strategies is pre-determined and stored,
wherein the collected information includes a frequency of use of media resources by the individual, subscriber service information from a subscriber account of the individual, and location data associated with the individual, wherein the audio recordings of the individual are captured from a plurality of end user devices and are utilized for the determining of the activities of the individual and the environments of the individual, and wherein the group of dimensions of the measure of the mood includes a fourth dimension identifying a plurality of intermediaries to negotiate with the entity the degree of access to the individual, and a fifth dimension identifying a plurality of parties and context of activities of the individual to create a plurality of multidimensional scenarios.

29. The method of claim 28, wherein the intermediary is an interactive avatar, and wherein the method comprises directing interactions between the intermediary and the entity according to instructions received from a strategy engine.

* * * * *